United States Patent
Horita et al.

(10) Patent No.: US 11,959,862 B2
(45) Date of Patent: Apr. 16, 2024

(54) DAMAGE FIGURE CREATION SUPPORTING APPARATUS, DAMAGE FIGURE CREATION SUPPORTING METHOD, DAMAGE FIGURE CREATION SUPPORTING PROGRAM, AND DAMAGE FIGURE CREATION SUPPORTING SYSTEM

(71) Applicant: FUJIFILM Corporation, Tokyo (JP)

(72) Inventors: Shuhei Horita, Tokyo (JP); Masafumi Tomono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 226 days.

(21) Appl. No.: 17/324,377

(22) Filed: May 19, 2021

(65) Prior Publication Data
US 2021/0270748 A1 Sep. 2, 2021

Related U.S. Application Data

(63) Continuation of application No. PCT/JP2019/047474, filed on Dec. 4, 2019.

(30) Foreign Application Priority Data

Dec. 13, 2018 (JP) .................. 2018-233657

(51) Int. Cl.
G01N 21/88 (2006.01)
(52) U.S. Cl.
CPC ..... G01N 21/8851 (2013.01); G01N 21/8803 (2013.01); *G01N 2021/8864* (2013.01);
(Continued)

(58) Field of Classification Search
CPC ........... G01N 21/8851; G01N 21/8803; G01N 2021/8864; G01N 2021/888; G01N 2021/8887
See application file for complete search history.

(56) References Cited

U.S. PATENT DOCUMENTS 9,805,261 B1 10/2017 Loveland et al.
2009/0301203 A1 12/2009 Brussieux
(Continued)

FOREIGN PATENT DOCUMENTS

CN 107040709 A 8/2017
CN 108027301 A 5/2018
(Continued)

OTHER PUBLICATIONS

An Office Action; "Notice of Reasons for Refusal," mailed by the Japanese Patent Office dated Aug. 1, 2022, which corresponds to Japanese Patent Application No. 2020-559982 and is related to U.S. Appl. No. 17/324,377; with English language translation.
(Continued)

*Primary Examiner* — Jamil Ahmed
(74) *Attorney, Agent, or Firm* — Studebaker & Brackett PC

(57) ABSTRACT

Provided are a damage figure creation supporting apparatus, a damage figure creation supporting method, a damage figure creation supporting program, and a damage figure creation supporting system that enable efficient creation of a damage figure using marking colors. The damage figure creation supporting method includes a step of acquiring an image obtained by photographing a surface of a structure in color, a step of analyzing the acquired image and detecting markings applied to damaged portions on the surface of the structure for respective colors, and a step of creating a damage figure, based on detection results of the markings for the respective colors. The damage figure is configured as a diagram of tracing the markings and has a layered structure with layers each corresponding to a color.

6 Claims, 26 Drawing Sheets

(52) U.S. Cl.
CPC ............... *G01N 2021/888* (2013.01); *G01N 2021/8887* (2013.01)

(56) References Cited

U.S. PATENT DOCUMENTS

| | | | |
|---|---|---|---|
| 2017/0142340 | A1 | 5/2017 | Kishi et al. |
| 2018/0189749 | A1 | 7/2018 | Takamori et al. |
| 2018/0247121 | A1 | 8/2018 | Loveland et al. |
| 2018/0292328 | A1 | 10/2018 | Karube |
| 2018/0292329 | A1 | 10/2018 | Karube |
| 2018/0299389 | A1 | 10/2018 | Kaneko |
| 2018/0300874 | A1 | 10/2018 | Karube |
| 2018/0308230 | A1 | 10/2018 | Karube |

FOREIGN PATENT DOCUMENTS

| | | | | |
|---|---|---|---|---|
| CN | 108431584 | A | | 8/2018 |
| CN | 108431585 | A | | 8/2018 |
| CN | 108463717 | A | | 8/2018 |
| CN | 108474748 | A | | 8/2018 |
| JP | H11-132961 | A | | 5/1999 |
| JP | H11132961 | A | * 5/1999 | ............ G01N 21/88 |
| JP | 2001-305075 | A | | 10/2001 |
| JP | 2001305075 | A | * 10/2001 | ........... G01N 21/958 |
| JP | 2002-228642 | A | | 8/2002 |
| JP | 2002-340805 | A | | 11/2002 |
| JP | 2010-266202 | A | | 11/2010 |
| JP | 2013-250058 | A | | 12/2013 |
| JP | 2013250058 | A | * 12/2013 | ............ G01N 21/88 |
| JP | 2014-006222 | A | | 1/2014 |
| JP | 2014-134470 | A | | 7/2014 |
| JP | 2018-185146 | A | | 11/2018 |
| JP | 2018-197692 | A | | 12/2018 |
| WO | 2017/051633 | A1 | | 3/2017 |
| WO | 2017/130477 | A1 | | 8/2017 |
| WO | 2017/221706 | A1 | | 12/2017 |
| WO | 2018/037689 | A1 | | 3/2018 |

OTHER PUBLICATIONS

Hiroaki Seki et al., "Development of position recording system on structural surface using laser pointer", IECON 2011—37th Annual Conference of the IEEE Industrial Electronics Society, Nov. 7, 2011, pp. 2639-2644, DOI: 10.1109/IECON.2011.6119727.

The extended European search report issued by the European Patent Office dated Jan. 5, 2022, which corresponds to European Patent Application No. 19897404.0-1210 and is related to U.S. Appl. No. 17/324,377.

International Search Report issued in PCT/JP2019/047474; dated Mar. 3, 2020.

International Preliminary Report on Patentability (Chapter II) issued in PCT/JP2019/047474; completed Apr. 6, 2021.

Fujita, Yusuke et al.; "Automatic and Exact Crack Extraction From Concrete Surfaces Using Image Processing Techniques"; Doboku Gakkai Ronbunshuu F; Sep. 2010; pp. 459-470; vol. 66, No. 3.; with partial English translation of the reference on p. 470.

An Office Action mailed by the Japanese Patent Office dated Jan. 11, 2023, which corresponds to Japanese Patent Application No. 2020-559982 and is related to U.S. Appl. No. 17/324,377; with English language translation.

An Office Action; "Decision of Dismissal of Amendment," mailed by the Japanese Patent Office dated Jun. 22, 2023, which corresponds to Japanese Patent Application No. 2020-559982 and is related to U.S. Appl. No. 17/324,377; with English language translation.

An Office Action; "Decision of Refusal," mailed by the Japanese Patent Office dated Jun. 22, 2023, which corresponds to Japanese Patent Application No. 2020-559982 and is related to U.S. Appl. No. 17/324,377; with English language translation.

An Office Action mailed by China National Intellectual Property Administration on Dec. 5, 2023, which corresponds to Chinese Patent Application No. 201980082671.8 and is related to U.S. Appl. No. 17/324,377; with English language translation.

\* cited by examiner

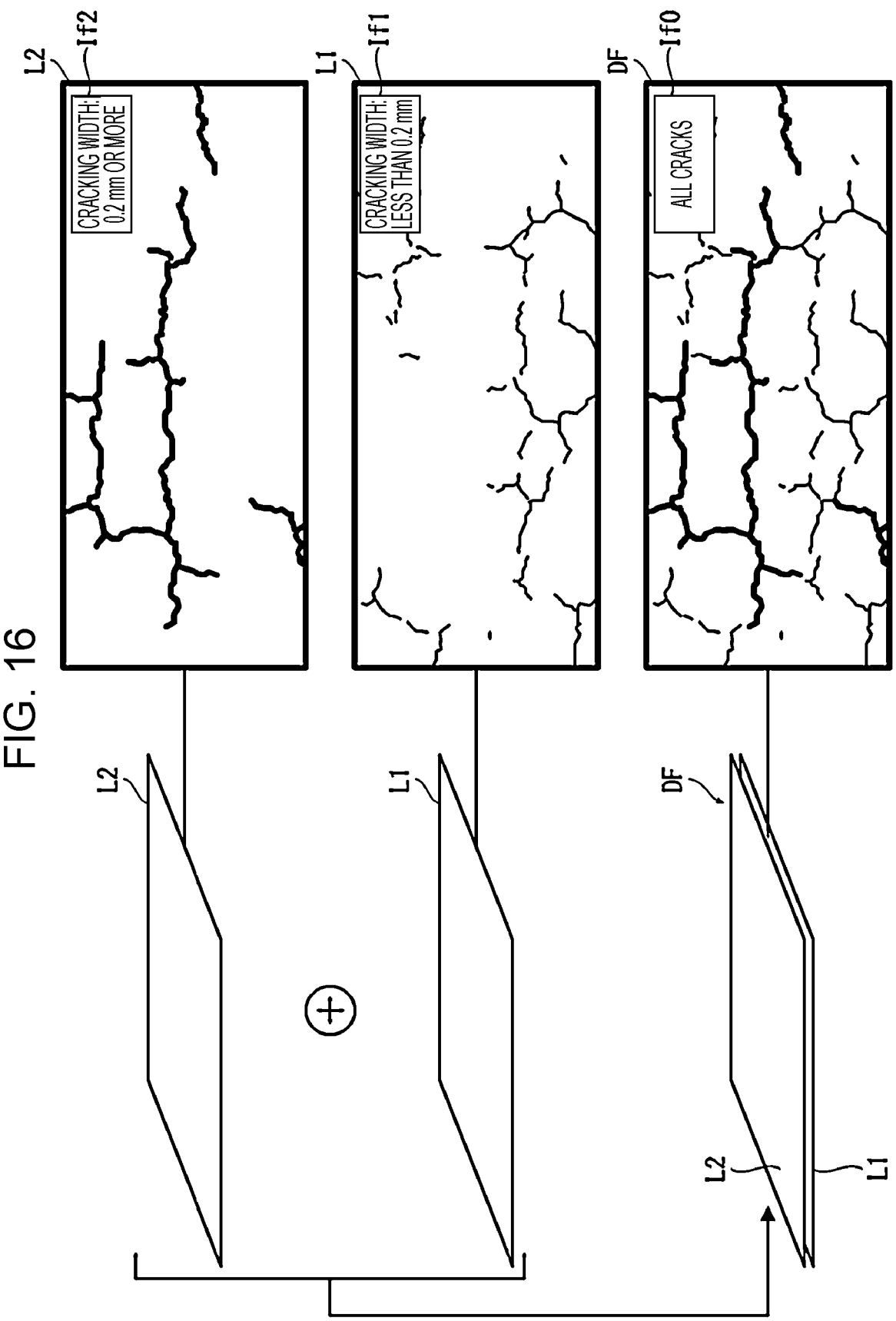

FIG. 17

(1) CLASS OF DEGREE OF DAMAGE

| CLASS | DEGREE FOCUSING ON MAXIMUM CRACKING WIDTH | DEGREE FOCUSING ON MINIMUM CRACKING INTERVAL | MARKING COLOR |
|---|---|---|---|
| a | NO DAMAGE | | - |
| b | SMALL | SMALL | WHITE |
| | SMALL | LARGE | |
| c | MEDIUM | SMALL | BLUE |
| | MEDIUM | LARGE | |
| d | LARGE | SMALL | YELLOW |
| e | LARGE | LARGE | RED |

(2) DEGREE FOCUSING ON MAXIMUM CRACKING WIDTH

| DEGREE | GENERAL CONDITIONS |
|---|---|
| LARGE | LARGE CRACKING WIDTH (RC STRUCTURE: 0.3 mm OR MORE; PC STRUCTURE: 0.2 mm OR MORE) |
| MEDIUM | MEDIUM CRACKING WIDTH (RC STRUCTURE: 0.2 mm OR MORE AND LESS THAN 0.3 mm; PC STRUCTURE: 0.1 mm OR MORE AND LESS THAN 0.2 mm) |
| SMALL | SMALL CRACKING WIDTH (RC STRUCTURE: LESS THAN 0.2 mm; PC STRUCTURE: LESS THAN 0.1 mm) |

RC:Reinforced Concrete , PC:Prestressd Concrete (3) DEGREE FOCUSING ON MINIMUM CRACKING INTERVAL

| DEGREE | GENERAL CONDITIONS |
|---|---|
| LARGE | SMALL CRACKING INTERVAL (MINIMUM CRACKING INTERVAL OF LESS THAN ABOUT 0.5 m) |
| SMALL | LARGE CRACKING INTERVAL (MINIMUM CRACKING INTERVAL OF ABOUT 0.5 m OR MORE) |

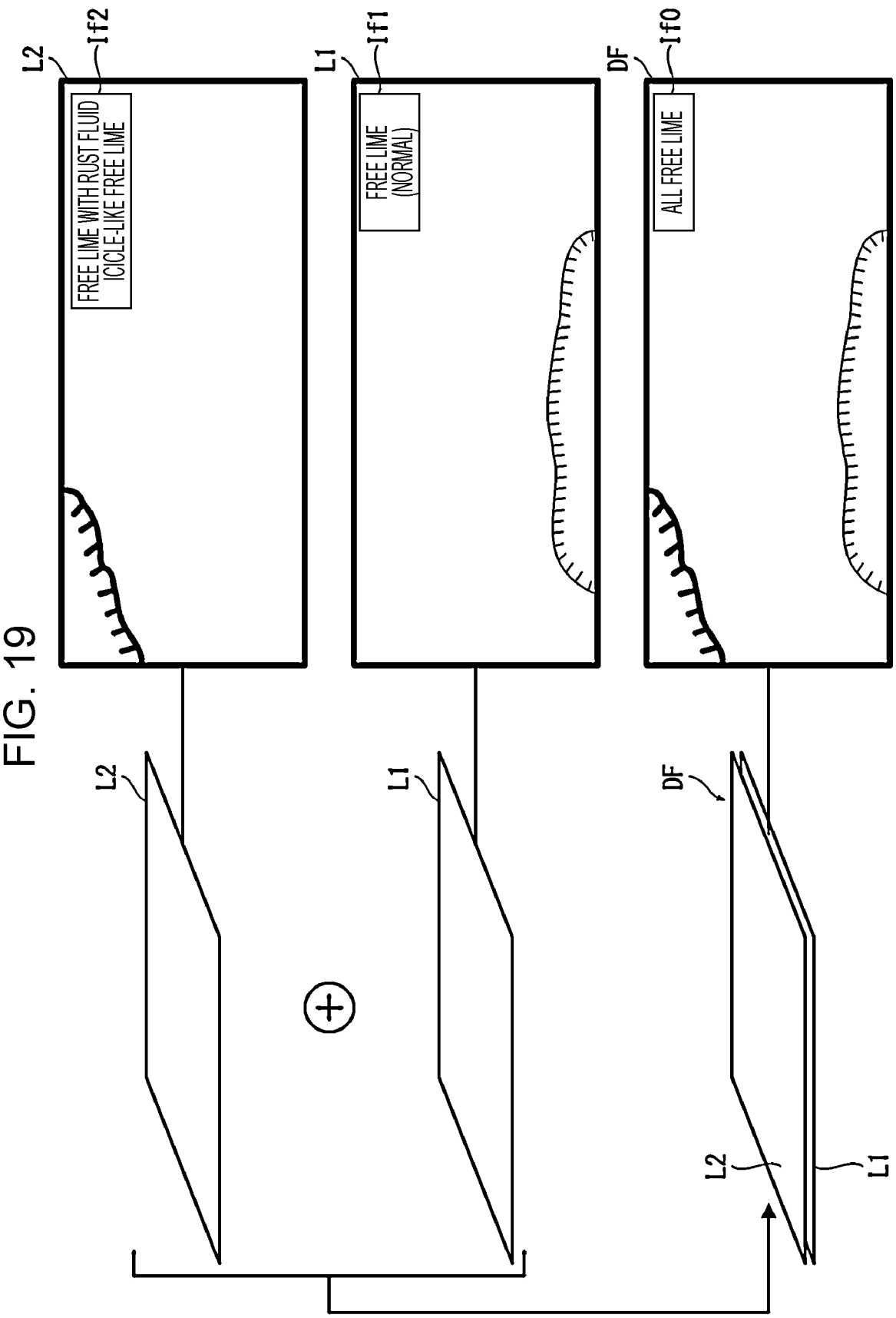

FIG. 20

| CLASS | GENERAL CONDITIONS | MARKING COLOR |
|---|---|---|
| a | NO DAMAGE | — |
| b | WATER LEAKAGE OCCURS FROM CRACKS. SUBSTANTIALLY NO RUST FLUID OR FREE LIME IS VISIBLE. | — |
| c | | WHITE |
| d | FREE LIME OCCURS FROM CRACKS. SUBSTANTIALLY NO RUST FLUID IS VISIBLE. | YELLOW |
| e | SIGNIFICANT AMOUNT OF RUST FLUID OR FREE LIME (FOR EXAMPLE, ICICLE-LIKE) OCCURS FROM CRACKS, OR SIGNIFICANT CONTAMINATION OF WATER LEAKAGE WITH SLUDGE OR RUST FLUID IS OBSERVED. | RED |

FIG. 22

| CLASS | GENERAL CONDITIONS | MARKING COLOR |
|---|---|---|
| a | NO DAMAGE | – |
| b | ONLY PEELING. | – |
| c | STEEL REINFORCEMENT IS EXPOSED, AND CORROSION OF STEEL REINFORCEMENT IS SLIGHT. | WHITE |
| d | STEEL REINFORCEMENT IS EXPOSED, AND CORROSION OR RUPTURE OF STEEL REINFORCEMENT IS SIGNIFICANT. | YELLOW |
| e | | RED |

FIG. 24

| DAMAGE TYPE | MARKING | DAMAGE TYPE | MARKING | DAMAGE TYPE | MARKING |
|---|---|---|---|---|---|
| CRACKS | ⋏ | FREE LIME | (dashed outline) | BUILDUP OF RUST | (grid-filled oval) |
| PEELING | (dashed outline oval) | WATER LEAKAGE | (hatched oval) | | |
| EXPOSURE OF STEEL REINFORCEMENT | (horizontal-lined oval) | OTHERS | (plain oval) | | |

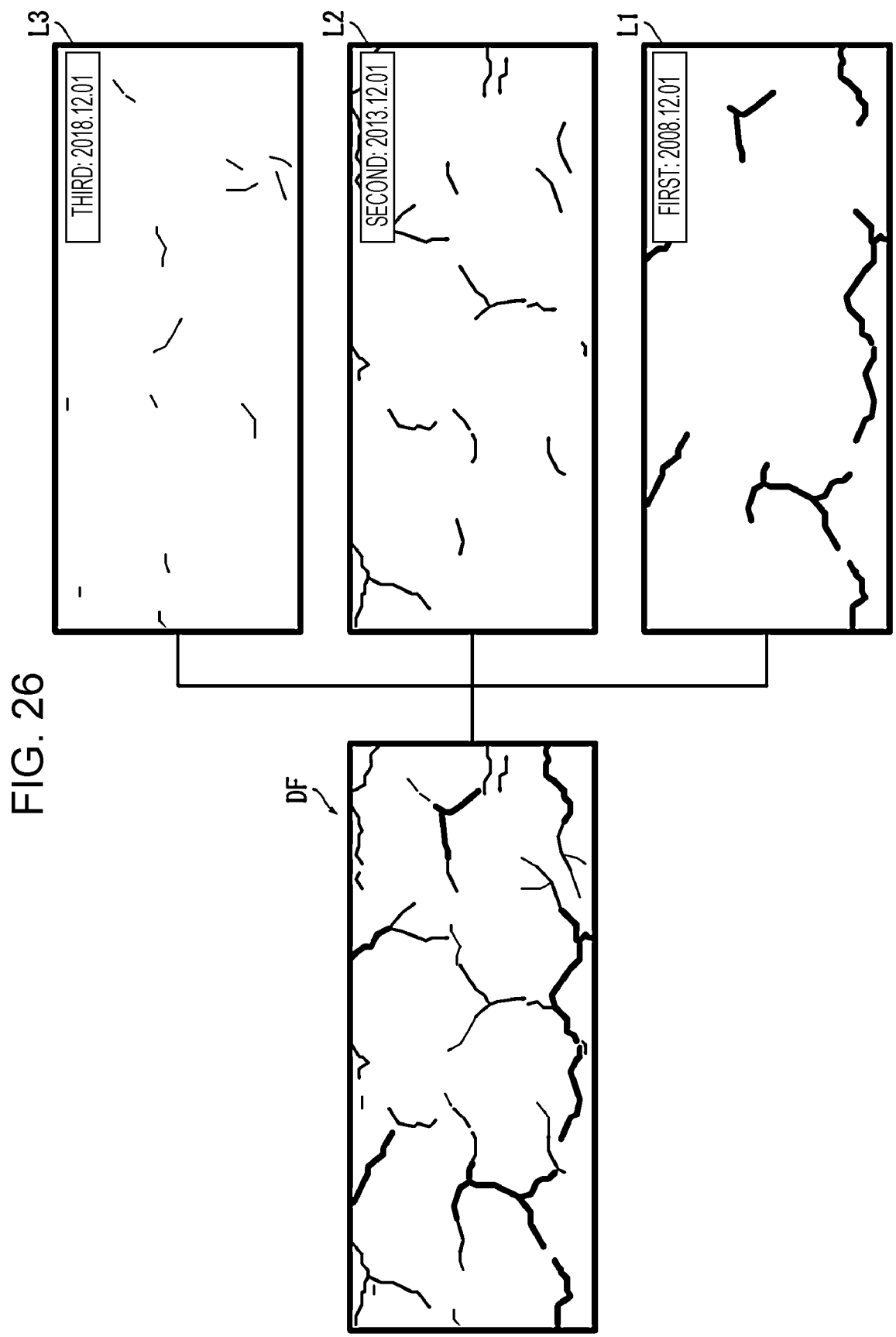

DAMAGE FIGURE CREATION SUPPORTING APPARATUS, DAMAGE FIGURE CREATION SUPPORTING METHOD, DAMAGE FIGURE CREATION SUPPORTING PROGRAM, AND DAMAGE FIGURE CREATION SUPPORTING SYSTEM

CROSS-REFERENCE TO RELATED APPLICATIONS

The present application is a Continuation of PCT International Application No. PCT/JP2019/047474 filed on Dec. 4, 2019 claiming priority under 35 U.S.C § 119(a) to Japanese Patent Application No. 2018-233657 filed on Dec. 13, 2018. Each of the above applications is hereby expressly incorporated by reference, in its entirety, into the present application.

BACKGROUND OF THE INVENTION

1. Field of the Invention

The present invention relates to a damage figure creation supporting apparatus, a damage figure creation supporting method, a damage figure creation supporting program, and a damage figure creation supporting system, and more specifically to a damage figure creation supporting apparatus, a damage figure creation supporting method, a damage figure creation supporting program, and a damage figure creation supporting system for supporting creation of a damage figure based on an inspection result of a structure.

2. Description of the Related Art

A structure such as a bridge is periodically inspected. In inspection work, outside work (on-site work) and inside work (in-office work) are separately performed. In the outside work, an inspection engineer goes to a site of inspection and performs an operation of visually inspecting an inspection location in close proximity (visually inspecting an area of interest at a distance close enough to touch the area of interest) (so-called close visual inspection). At this time, the inspection engineer performs operations, such as marking (operation of drawing a line with chalk (also referred to as chalking) along damage (also referred to as deformation)), sketching, and photographing (taking photographs of the site), on the basis of the confirmation result by visual inspection. In the inside work, an operation of creating a report is performed on the basis of sketches and photographs obtained on the site. The report includes a damage figure (also referred to as a deformation figure), and the inspection engineer writes a damaged portion to a drawing (for example, drawing of industrial data such as CAD (Computer-Aided Design)) for each inspection location on the basis of the sketches and photographs to create a damage figure.

However, the existing inspection work performed in the procedure described above imposes a heavy burden on the inspection engineer, and there is also a problem in that an error (such as omission of writing) is likely to occur in the creation of a damage figure.

Accordingly, JP2014-6222A proposes a technique for automatically detecting markings, cracks, and so on from a captured image of a surface of a concrete structure. JP2002-340805A proposes a technique for applying a water-retaining agent to a surface of a concrete structure after marking is completed to easily detect a marked portion from a captured image.

SUMMARY OF THE INVENTION

Marking is typically performed using chalk, and the inspection engineer may perform marking using different colors of chalk. For example, different colors may be used according to the degree of damage, the type of damage, the inspection time, and so on. Since there is no specific rule for the colors of chalk to be used, there is a drawback that a third party is not able to utilize information on marking colors when attempting to perform creation of a damage figure or other operations on the basis of the result of the on-site work.

The present invention has been made in view of such circumstances, and an object thereof is to provide a damage figure creation supporting apparatus, a damage figure creation supporting method, a damage figure creation supporting program, and a damage figure creation supporting system that enable efficient creation of a damage figure using marking colors.

Means for solving the above problems are as follows.

(1) A damage figure creation supporting apparatus including an image acquisition unit that acquires an image obtained by photographing a surface of a structure in color, a marking detection unit that analyzes the image and detects markings applied to damaged portions on the surface of the structure for respective colors, and a damage figure creation unit that creates a damage figure, based on detection results of the markings for the respective colors.

(2) The damage figure creation supporting apparatus according to (1) above, further including a storage unit that stores information determined for the respective colors of the markings, in which the damage figure creation unit refers to the information stored in the storage unit and creates the damage figure.

(3) The damage figure creation supporting apparatus according to (2) above, in which the storage unit stores information on degrees of damage determined for the respective colors of the markings, and the damage figure creation unit refers to the information stored in the storage unit and creates the damage figure in which the degrees of damage are classified.

(4) The damage figure creation supporting apparatus according to (3) above, in which the storage unit stores information on degrees of cracking determined for the respective colors of the markings, and the damage figure creation unit creates the damage figure in which the degrees of cracking are classified.

(5) The damage figure creation supporting apparatus according to (3) or (4) above, in which the storage unit stores information on degrees of water leakage and/or degrees of free lime determined for the respective colors of the markings, and the damage figure creation unit creates the damage figure in which the degrees of water leakage and/or the degrees of free lime are classified.

(6) The damage figure creation supporting apparatus according to any one of (3) to (5) above, in which the storage unit stores information on degrees of peeling and/or degrees of exposure of steel reinforcement determined for the respective colors of the markings, and the damage figure creation unit creates the damage figure in which the degrees of peeling and/or the degrees of exposure of steel reinforcement are classified.

(7) The damage figure creation supporting apparatus according to any one of (2) to (6) above, in which the storage unit stores information on types of damage determined for the respective colors of the markings, and the damage figure creation unit refers to the information stored in the storage unit and creates the damage figure in which the types of damage are classified.

(8) The damage figure creation supporting apparatus according to any one of (2) to (7) above, in which the storage unit stores information on inspection times determined for the respective colors of the markings, and the damage figure creation unit refers to the information stored in the storage unit and creates the damage figure in which the inspection times are classified.

(9) The damage figure creation supporting apparatus according to any one of (2) to (7) above, in which the storage unit stores information on inspection times determined for the respective colors of the markings, and the damage figure creation unit refers to the information stored in the storage unit and creates the damage figure for each of the inspection times.

(10) The damage figure creation supporting apparatus according to any one of (2) to (9) above, in which the storage unit stores information on at least one of degrees of fracture in a steel member, degrees of corrosion of the steel member, or degrees of deterioration of anti-corrosion function of the steel member determined for the respective colors of the markings, and the damage figure creation unit refers to the information stored in the storage unit and creates the damage figure in which at least one of the degrees of fracture in the steel member, the degrees of corrosion of the steel member, or the degrees of deterioration of anti-corrosion function of the steel member are classified.

(11) A damage figure creation supporting method including a step of acquiring an image obtained by photographing a surface of a structure in color, a step of analyzing the image and detecting markings applied to damaged portions on the surface of the structure for respective colors, and a step of creating a damage figure, based on detection results of the markings for the respective colors.

(12) A damage figure creation supporting program for causing a computer to implement a function of acquiring an image obtained by photographing a surface of a structure in color, a function of analyzing the image and detecting markings applied to damaged portions on the surface of the structure for respective colors, and a function of creating a damage figure, based on detection results of the markings for the respective colors.

(13) A damage figure creation supporting system including a user terminal and a server, the user terminal including a terminal-side image input unit that accepts input of an image obtained by photographing a surface of a structure in color, a terminal-side transmitting unit that transmits the image to the server, and a terminal-side receiving unit that receives from the server a damage figure created from the image, the server including a server-side receiving unit that receives the image from the user terminal, a marking detection unit that analyzes the image and detects markings applied to damaged portions on the surface of the structure for respective colors, a damage figure creation unit that creates a damage figure, based on detection results of the markings for the respective colors, and a server-side transmitting unit that transmits the damage figure to the user terminal.

According to the present invention, it is possible to efficiently create a damage figure by detecting a color of a marking from an image, which is obtained by photographing a surface of a structure in color, and analyzing the image.

BRIEF DESCRIPTION OF THE DRAWINGS

FIG. 16 is a diagram illustrating an example damage figure in which damage information is classified according to the degree of cracking;

FIG. 17 includes tables illustrating example evaluation criteria for cracking;

FIG. 19 is a diagram illustrating an example damage figure in which damage information is classified according to the degree of free lime;

FIG. 20 is a table illustrating example evaluation criteria for water leakage and free lime;

FIG. 22 is a table illustrating example evaluation criteria for peeling and exposure of steel reinforcement;

FIG. 24 is a diagram illustrating an example manner of displaying damage on a damage figure;

FIG. 26 is a diagram illustrating an example configuration of a damage figure in which damage information is classified by inspection time.

DESCRIPTION OF THE PREFERRED EMBODIMENTS

The following describes preferred embodiments of the present invention in detail with reference to the accompanying drawings.

First Embodiment

[System Configuration of Damage Figure Creation Supporting System]

Figure 1:
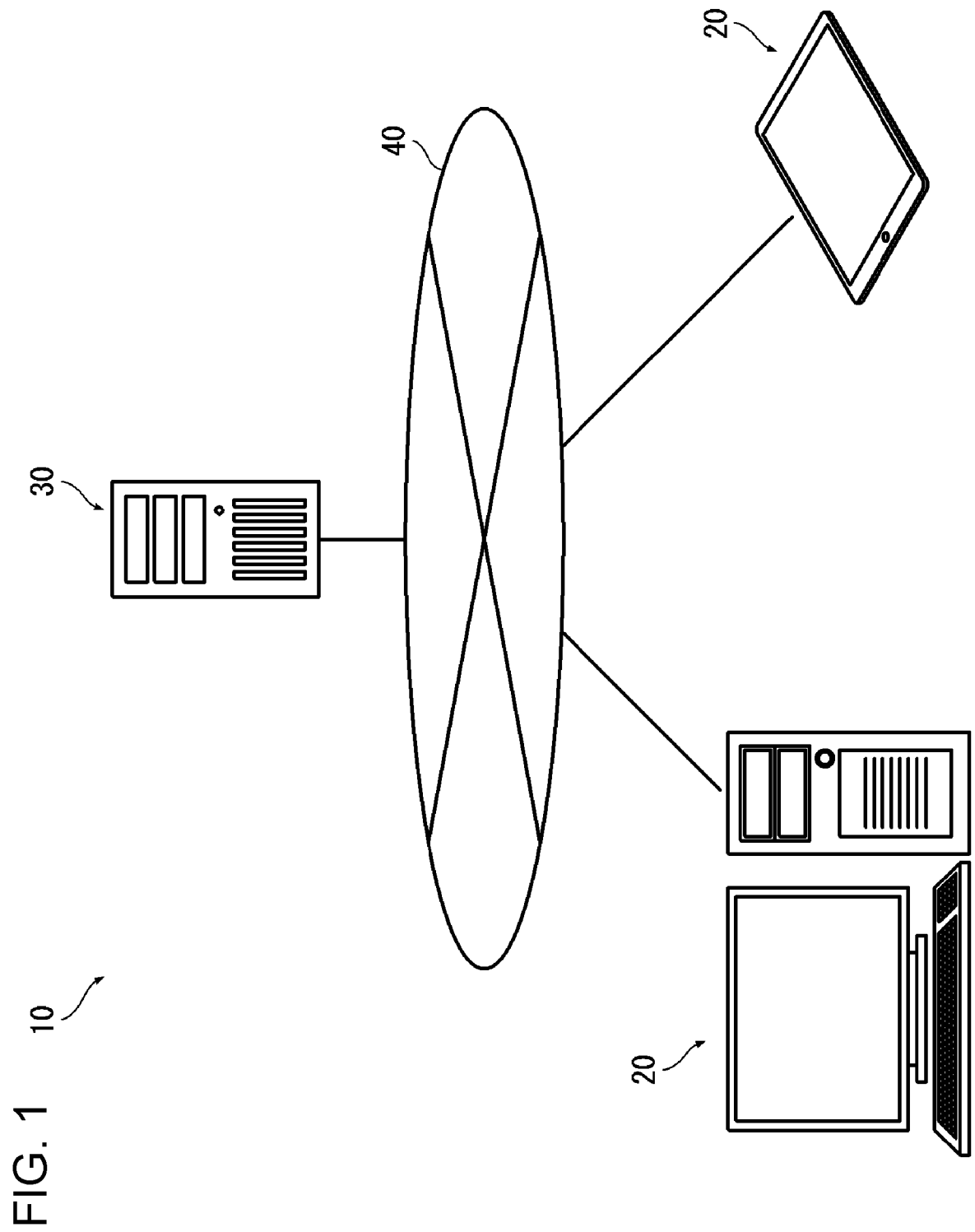
FIG. 1 is a system configuration diagram illustrating an embodiment of a damage figure creation supporting system.

FIG. 1 is a system configuration diagram illustrating an embodiment of a damage figure creation supporting system.

A damage figure creation supporting system 10 according to this embodiment is constituted by user terminals 20 that perform front-end processing, and a server 30 that performs back-end processing. The user terminals 20 and the server 30 are communicably connected to each other via a network 40. Examples of the network 40 include the Internet.

[User Terminal]

The user terminals 20 are constituted by general-purpose computers such as personal computers, tablet computers, and smartphones.

Figure 2:
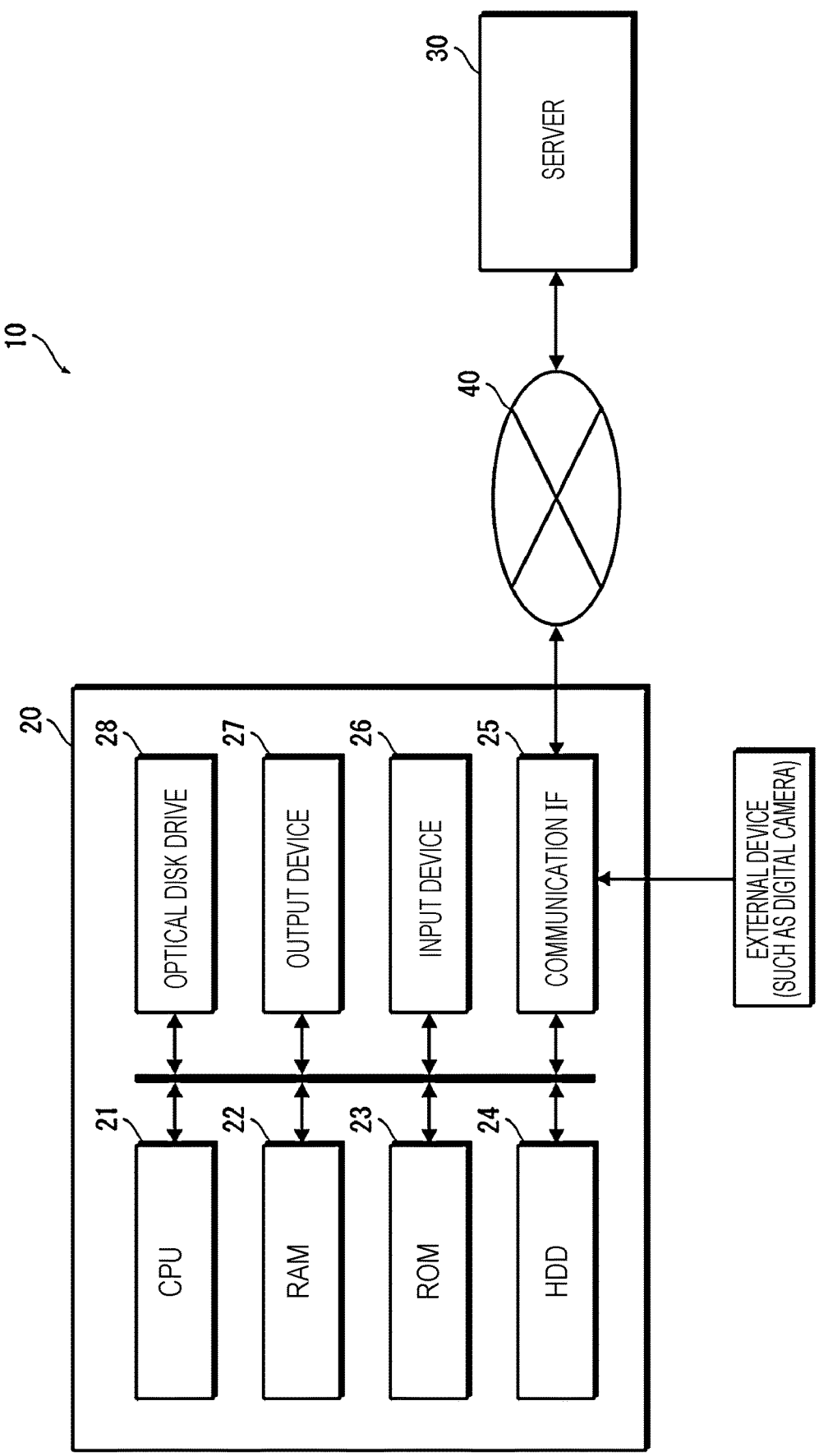
FIG. 2 is a block diagram illustrating an example hardware configuration of a user terminal.

FIG. 2 is a block diagram illustrating an example hardware configuration of a user terminal. As illustrated in FIG. 2, the user terminal 20 includes a CPU (Central Processing Unit) 21, a RAM (Random Access Memory) 22, a ROM (Read Only Memory) 23, an HDD (Hard Disk Drive) 24, a communication IF (Interface) 25, an input device 26, an output device 27, an optical disk drive 28, and so on. The HDD 24 stores a program necessary for performing front-end processing, and various data necessary for the processing. The input device 26 is constituted by, for example, a keyboard, a mouse, a touch panel, and so on. The output device 27 is constituted by, for example, a display, a printer, and so on. The user terminal 20 is connected to the network 40 via the communication IF 25.

Figure 3:
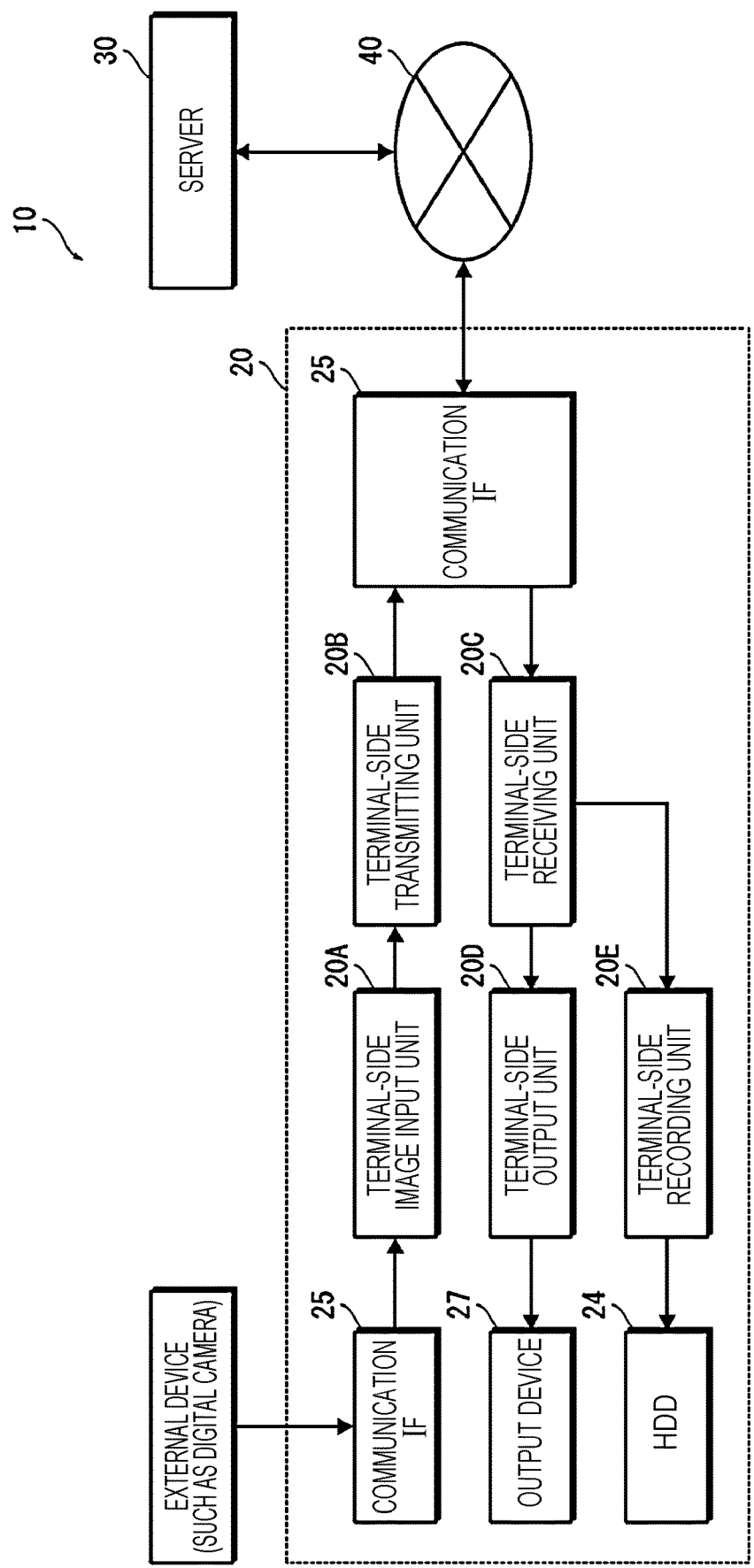
FIG. 3 is a block diagram of main functions that the user terminal has.

FIG. 3 is a block diagram of main functions that a user terminal has.

The user terminal 20 performs the front-end processing, such as a process of accepting input of an image obtained by photographing a structure to be inspected, a process of transmitting (uploading) an input image to the server 30, a process of receiving (downloading) a processing result obtained by the server 30, a process of outputting the received processing result, and a process of recording the received processing result. Accordingly, as illustrated in FIG. 3, the user terminal 20 has functions of a terminal-side image input unit 20A that accepts input of an image, a terminal-side transmitting unit 20B that transmits an input image to the server 30, a terminal-side receiving unit 20C that receives a processing result from the server 30, a terminal-side output unit 20D that outputs the received processing result, and a terminal-side recording unit 20E that records the received processing result. These functions are implemented by a computer of the user terminal 20 executing a predetermined program.

The terminal-side image input unit 20A performs a process of accepting input of an image obtained by photographing an inspection target. The terminal-side image input unit 20A receives an input image from an external device such as a digital camera via the communication IF 25. The image is an image obtained by photographing a surface of a structure, which is an inspection target, in color. The image is thus a color image. Specifically, the image is an image (so-called RGB image) having respective intensity values (brightness values) of R (red), G (green), and B (blue) in units of pixels.

The terminal-side transmitting unit 20B performs a process of transmitting (uploading) the input image to the server 30. The terminal-side transmitting unit 20B transmits the image to the server 30 via the network 40.

The terminal-side receiving unit 20C performs a process of receiving a processing result from the server 30. The terminal-side receiving unit 20C receives a processing result from the server 30 via the network 40. As described below, the server 30 creates a damage figure (also referred to as a deformation figure) from the image transmitted from the user terminal 20. The created damage figure is transmitted to the user terminal 20 as a processing result. The terminal-side receiving unit 20C receives (downloads) the damage figure transmitted from the server 30.

The terminal-side output unit 20D performs a process of outputting the processing result. Specifically, the terminal-side output unit 20D outputs the damage figure, which is the processing result, to the display that is the output device 27. If necessary, the terminal-side output unit 20D outputs the input image to the display that is the output device 27.

The terminal-side recording unit 20E performs a process of recording the processing result. Specifically, the terminal-side recording unit 20E records the damage figure, which is the processing result, in the HDD 24. At this time, the image from which the damage figure is created is recorded in association with the damage figure.

[Server]

The server 30 is constituted by a typical server computer. The server 30 substantially constitutes a damage figure creation supporting apparatus.

Figure 4:
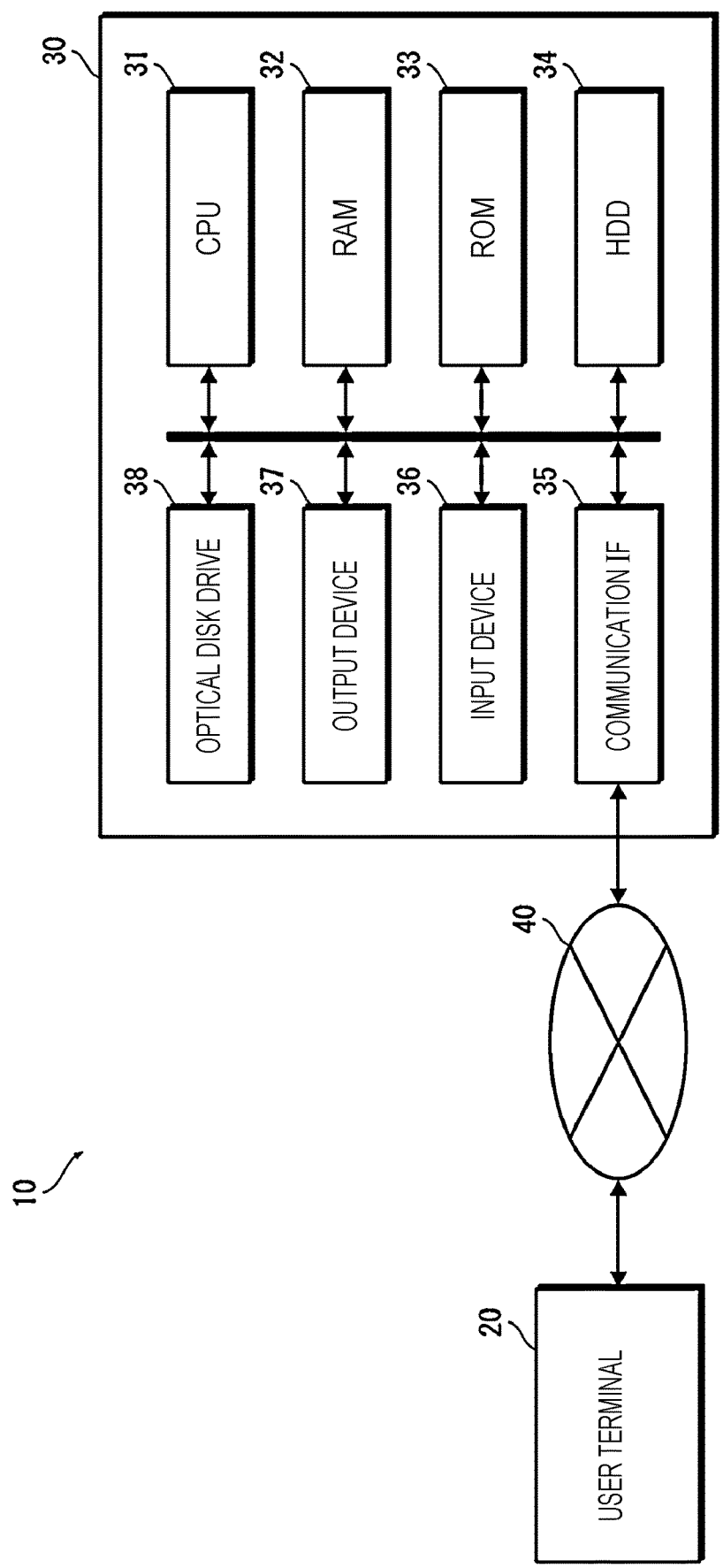
FIG. 4 is a block diagram illustrating an example hardware configuration of a server.

FIG. 4 is a block diagram illustrating an example hardware configuration of a server. As illustrated in FIG. 4, the server 30 includes a CPU 31, a RAM 32, a ROM 33, an HDD 34, a communication IF 35, an input device 36, an output device 37, an optical disk drive 38, and so on. The HDD 34 stores a program necessary for performing back-end processing, and various data necessary for the processing. The input device 36 is constituted by, for example, a keyboard, a mouse, a touch panel, and so on. The output device 37 is constituted by, for example, a display, a printer, and so on. The server 30 is connected to the network 40 via the communication IF 35.

Figure 5:
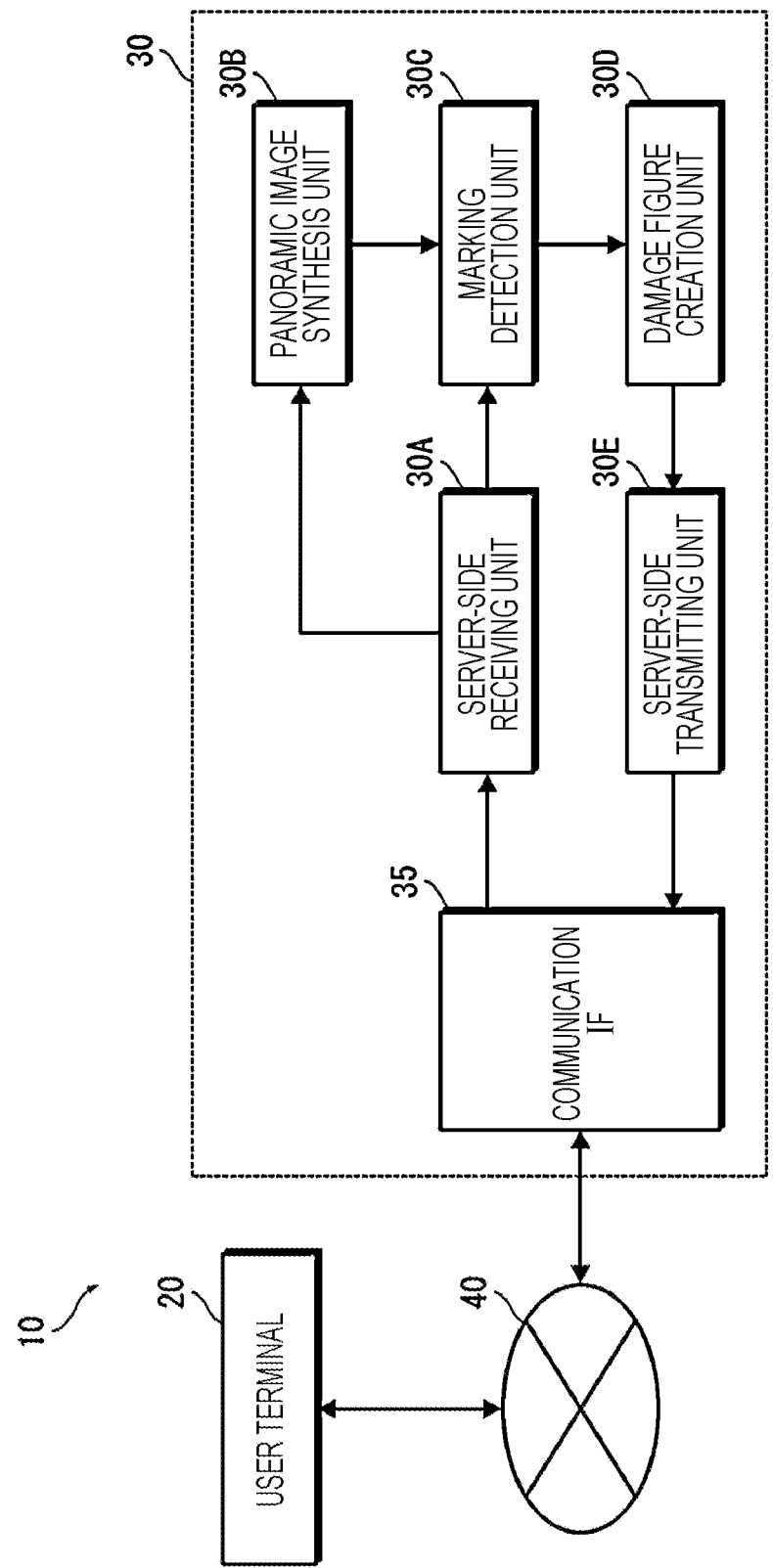
FIG. 5 is a block diagram of main functions that the server has.

FIG. 5 is a block diagram of main functions that a server has.

The server 30 performs the back-end processing, such as a process of receiving an image transmitted from the user terminal 20, a process of synthesizing a panoramic image from segment images upon receipt of images obtained by photographing segments of an inspection location, a process of analyzing the image to detect markings on the surface of the structure for each color, a process of creating a damage figure on the basis of detection results of the markings, and a process of transmitting the created damage figure to the user terminal 20 as a processing result. Accordingly, as illustrated in FIG. 5, the server 30 has functions of a server-side receiving unit 30A that receives an image from the user terminal 20, a panoramic image synthesis unit 30B that synthesizes a panoramic image from segment images, a marking detection unit 30C that detects markings from the image, a damage figure creation unit 30D that creates a damage figure on the basis of detection results of the markings, a server-side transmitting unit 30E that transmits the created damage figure to the user terminal 20, and so on. These functions are implemented by a computer of the server 30 executing a predetermined program. The program substantially constitutes a damage figure creation supporting program.

The server-side receiving unit 30A performs a process of receiving an image transmitted from the user terminal 20. The server-side receiving unit 30A receives an image from the user terminal 20 via the network 40. The server-side receiving unit 30A is an example of an image acquisition unit. The received image is stored in the HDD 34. The image can also be acquired as a set of images obtained by photographing segments of an inspection location. In this case, the images are then combined into a panoramic image by the panoramic image synthesis unit 30B.

Upon receipt of images obtained by photographing segments of an inspection location, the panoramic image synthesis unit 30B performs a process of synthesizing a panoramic image from the segment images. Panoramic image synthesis is a known technique, and the detailed description thereof is thus omitted. For example, the panoramic image synthesis unit 30B detects correspondence points in images and combines segment images. At this time, the panoramic image synthesis unit 30B performs correction, such as scaling correction, tilt correction, and rotation correction, on each image, if necessary.

When capturing images of segments of an inspection location, a photographer (inspection engineer) photographs the inspection location such that adjacent images overlap each other.

The marking detection unit 30C performs a process of analyzing the image to detect markings for each color. For example, when marking is performed using two colors of white and red, the marking detection unit 30C detects markings from the images for each of white and red. The markings can be detected using various methods. For example, there is available a method for detecting markings for each color using a learned model obtained by machine learning using images including markings of a plurality of colors as data for learning. The type of machine learning algorithm is not limited, and, for example, an algorithm using a neural network such as RNN (Recurrent Neural Network), CNN (Convolutional Neural Network), or MLP (Multilayer Perceptron) may be used. Alternatively, for example, a method for detecting markings for each color on the basis of a luminance distribution and an RGB value distribution of an image. Since an area with a marking has a different luminance distribution and RGB value distribution from any other area, a change in brightness value and a change in RGB value are searched for, and, accordingly, markings can be detected from the image for each color.

The damage figure creation unit 30D performs a process of creating a damage figure on the basis of detection results of the markings. The damage figure is created as a diagram of tracing the markings detected from an image and is created in which the markings are classified by color. For example, a damage figure having a layered structure with layers each corresponding to a color is created.

The server-side transmitting unit 30E performs a process of transmitting the created damage figure to the user terminal 20. The server-side transmitting unit 30E transmits the damage figure to the user terminal 20 via the network 40.

[Method for Creating Damage Figure]

Next, a method for creating a damage figure (damage figure creation supporting method) using the damage figure creation supporting system 10 according to this embodiment will be described. A description will be given taking, as an example, inspection of a bridge, in particular, inspection of the deck slab of the bridge.

[Bridge]

Figure 6:
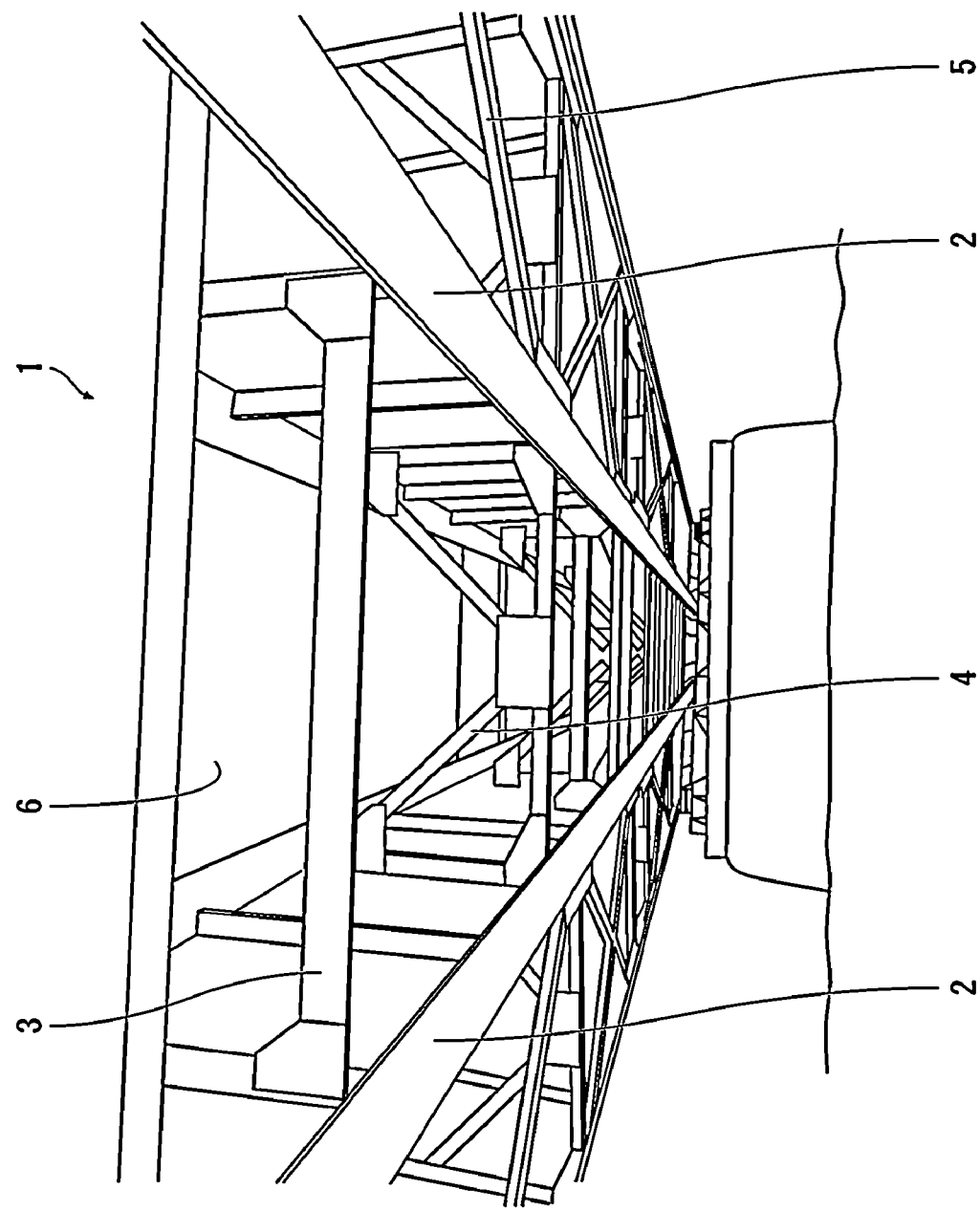
FIG. 6 is a perspective view of a bridge as viewed from below.

FIG. 6 is a perspective view of a bridge as viewed from below.

A bridge 1 illustrated in FIG. 6 has a three-dimensional structure including main girders 2, cross beams 3, cross frames 4, lateral bracings 5, and a deck slab 6, and has a structure in which these members are connected to one another by bolts, rivets, welding, or the like.

The deck slab 6, on which vehicles and the like travel, is placed above the main girders 2 and the like. The deck slab 6 is typically made of reinforced concrete. The main girders 2 are members caused to span between abutments or piers to support the load of vehicles and the like on the deck slab 6. The main girders 2 have surfaces (vertical surfaces) orthogonal to a surface (horizontal surface) of the deck slab 6. The cross beams 3 are members connecting the main girders 2 to each other. The cross beams 3 are disposed so that the plurality of main girders 2 can support the load. The cross frames 4 and the lateral bracings 5 are members that connect the main girders 2 to each other. The cross frames 4 and the lateral bracings 5 are disposed to resist lateral load imposed by wind and earthquake.

[Inspection of Bridge]

The inspection of the deck slab 6 is typically performed on a panel-by-panel basis. Each panel is one of sections of the deck slab 6, which are separated by the main girders 2 and the cross beams 3.

In inspection using the damage figure creation supporting system 10 according to this embodiment, marking and photographing operations are performed on the site as outside work (on-site work). As inside work (in-office work), a damage figure is created from photographs (images) obtained in the outside work.

[Marking]

Marking is an operation of drawing a line with chalk (also referred to as chalking) along damage (also referred to as deformation) such as cracks.

Figure 7:
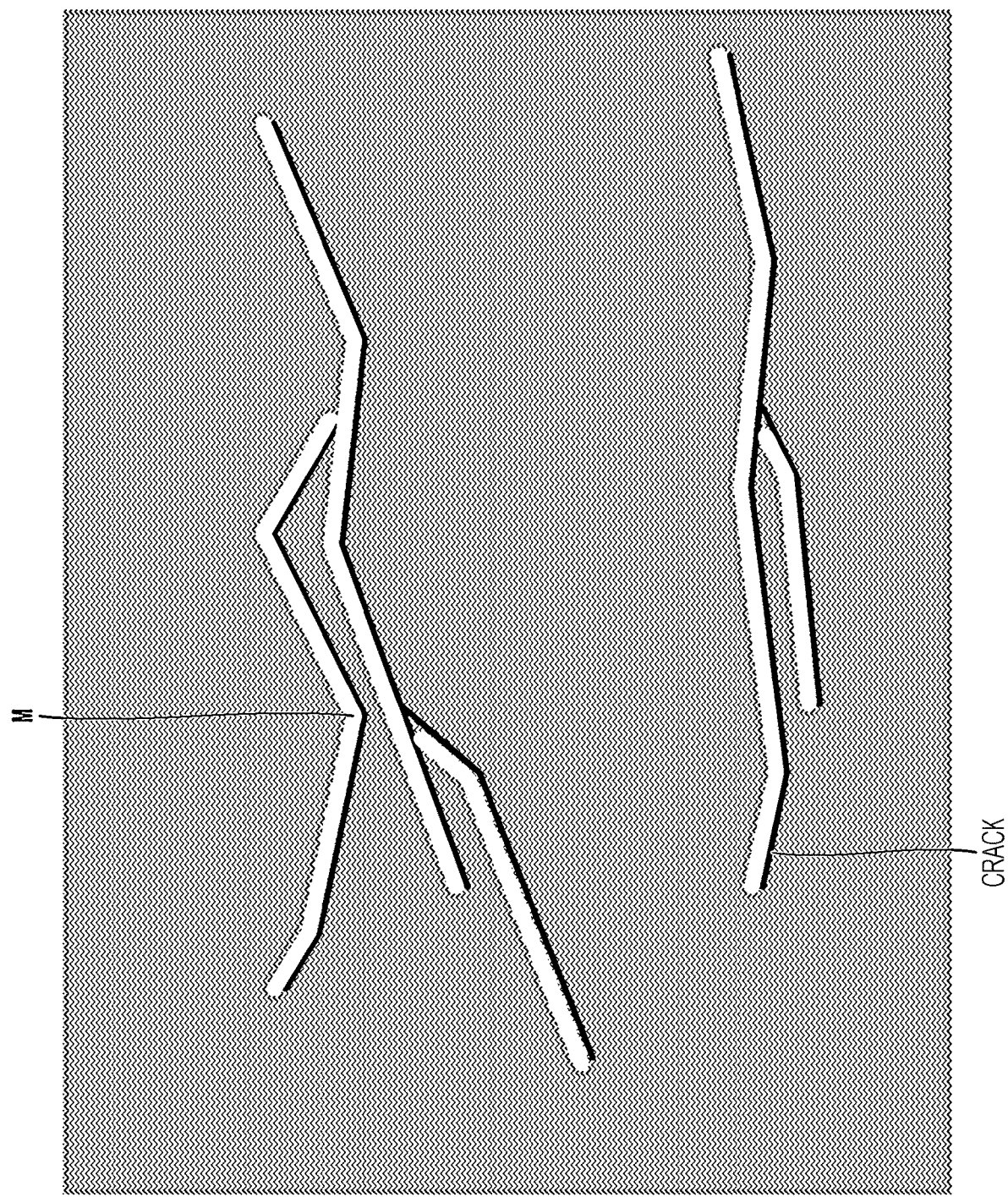
FIG. 7 is a diagram illustrating an example of markings.

FIG. 7 is a diagram illustrating an example of markings. FIG. 7 illustrates an example of markings applied to cracks appearing on a surface of a structure.

As illustrated in FIG. 7, marking is performed by drawing lines M with chalk along cracks appearing on the surface of the structure. Marking for other damage, such as water leakage, free lime, peeling, or exposure of steel reinforcement, is performed by drawing a line along an outer edge of an area where the damage has occurred. If necessary, information (such as characters and symbols) indicating the state or the like of damage is added.

[Photographing]

Figure 8:
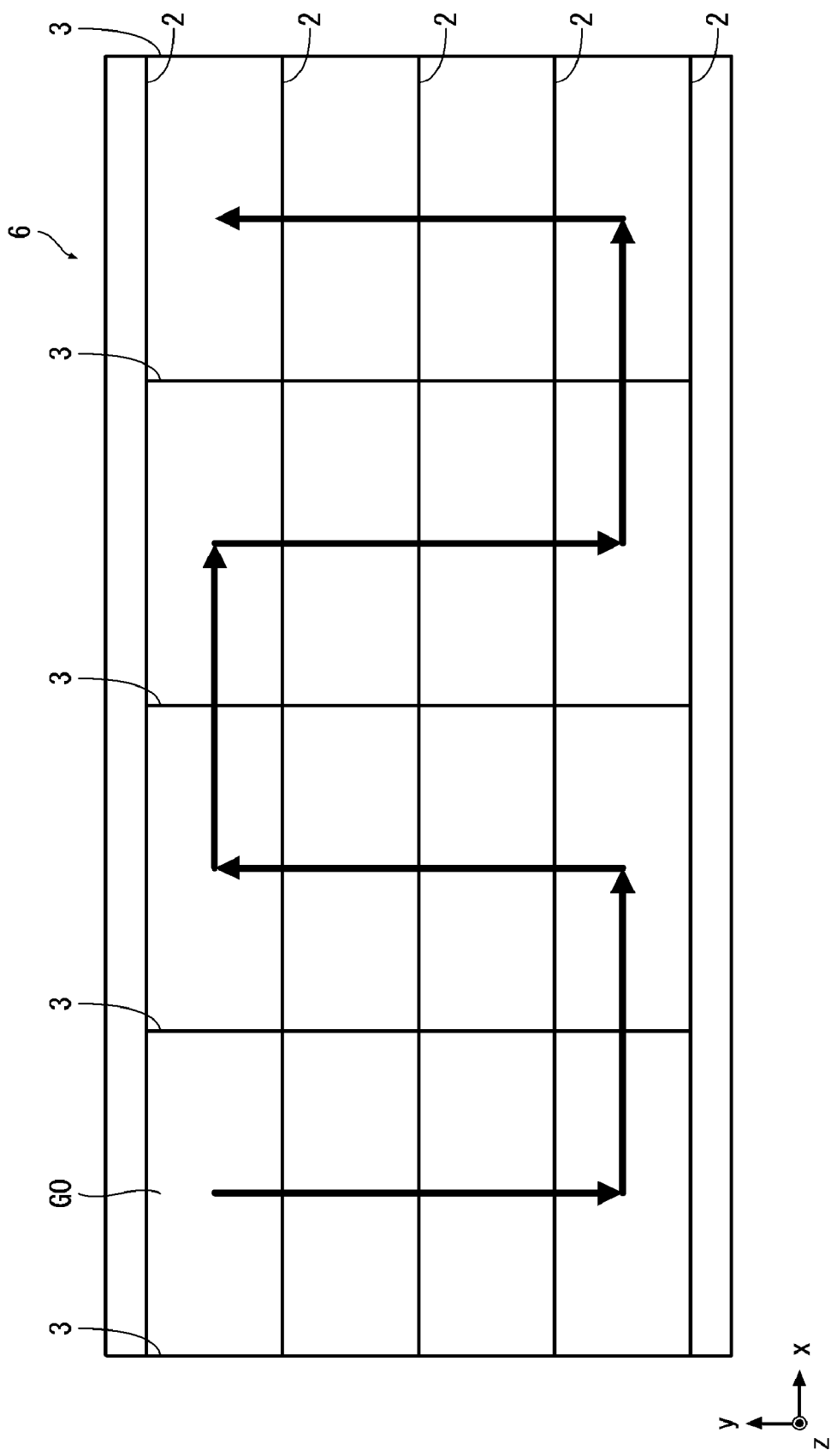
FIG. 8 is a diagram illustrating an example procedure of photographing a deck slab.

FIG. 8 is a diagram illustrating an example procedure of photographing a deck slab.

As described above, the inspection of the deck slab is performed on a panel-by-panel basis. Panels GO are each one of sections separated by the main girders 2 and the cross beams 3. Accordingly, photographing is also performed for each of the panels GO. FIG. 8 illustrates how the panels GO are photographed with sequential movement in the y direction and the x direction (in FIG. 8, arrows indicate movement directions). In FIG. 8, the longitudinal direction of the deck slab 6 (the direction along the main girders 2) is denoted by x, the direction orthogonal to x in the plane of the deck slab 6 (the direction along the cross beams 3) is denoted by y, and the direction orthogonal to the deck slab 6 (vertically downward direction) is denoted by z.

Figure 9:
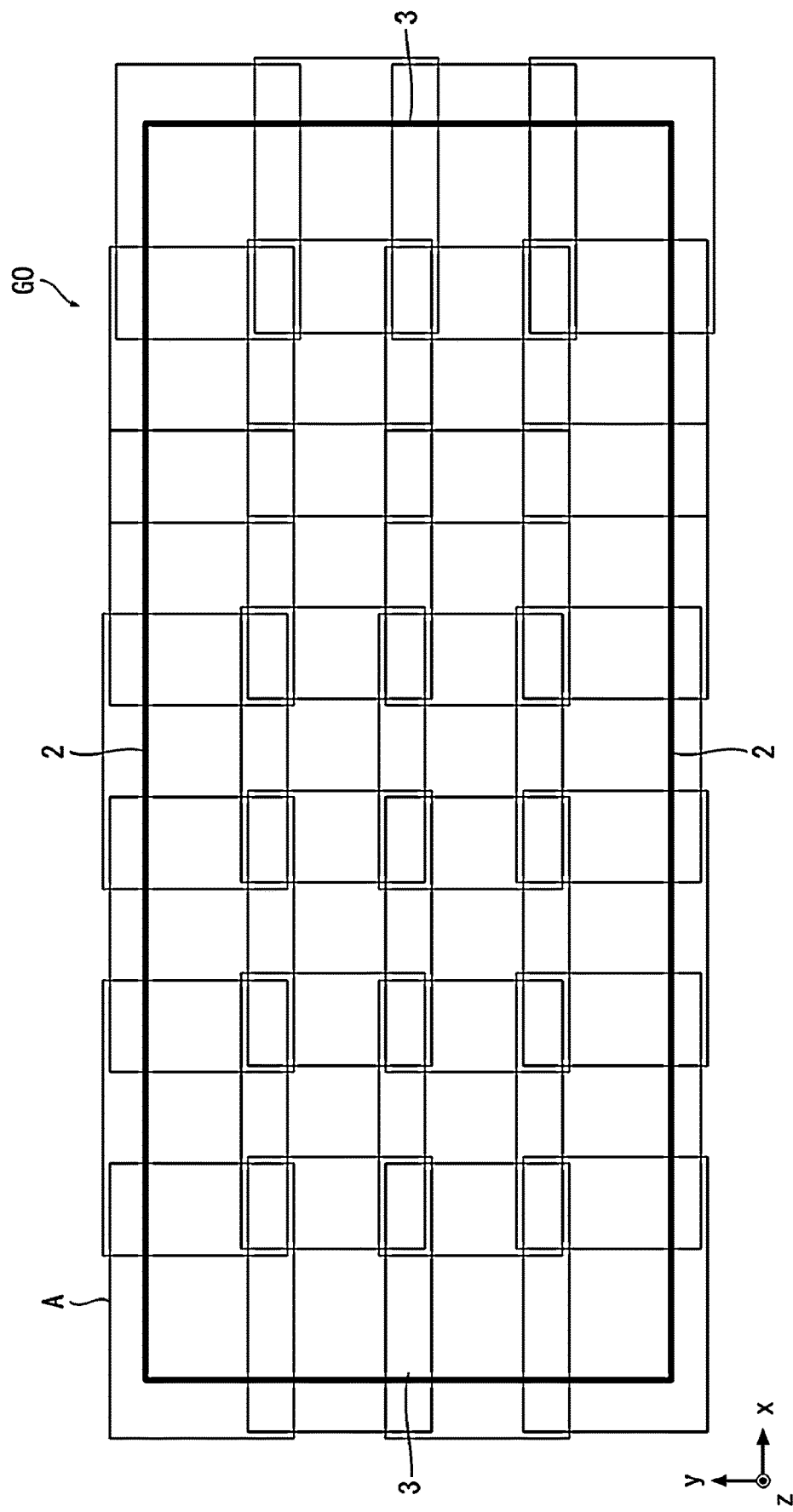
FIG. 9 is a diagram illustrating an example procedure of photographing one panel.

FIG. 9 is a diagram illustrating an example procedure of photographing one panel.

If it is difficult to photograph the entire region of a panel GO by a single photographing operation or if, even when it is possible to photograph the entire region of the panel GO by a single photographing operation, it is difficult to obtain a high-resolution image, the area to be photographed is divided to photograph the area a plurality of times. In FIG. 9, a frame indicated by symbol A is a frame indicating a range covered in a single photographing operation. The example illustrated in FIG. 9 illustrates how areas in the panel GO are photographed with sequential movement in the y direction and the x direction (in FIG. 9, arrows indicate movement directions).

The photographer (inspection engineer) photographs the deck slab, which is a surface of an inspection target, from a certain distance while facing the deck slab. The photographer (inspection engineer) performs photographing such that adjacent areas to be photographed partially overlap each other (for example, the photographer (inspection engineer) performs photographing such that adjacent areas to be photographed overlap by 30% or more). As a result, panoramic image synthesis can be performed with high accuracy.

Photographing is performed using a digital camera capable of color photography.

[Creation of Damage Figure]

A description will be given taking, as an example, creation of a damage figure for a single panel GO.

Figure 10:
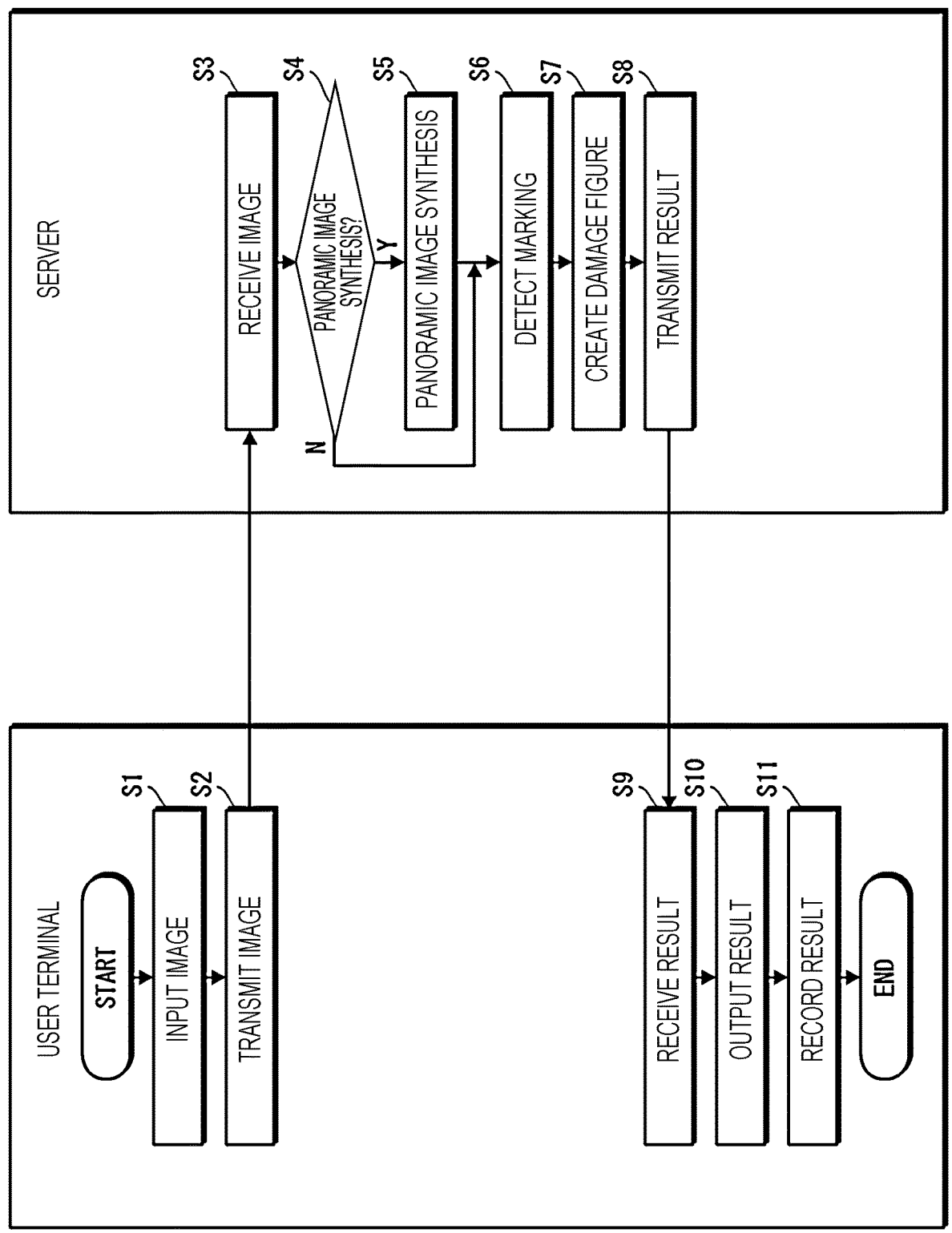
FIG. 10 is a flowchart illustrating a processing procedure to create a damage figure using a damage figure creation supporting system according to a first embodiment.

FIG. 10 is a flowchart illustrating a processing procedure to create a damage figure using the damage figure creation supporting system according to this embodiment.

First, an image is input to the user terminal 20 (step S1). In a case where a single panel GO is divided into a plurality of sections which are photographed, images of all the photographed sections are input.

Then, the user terminal 20 transmits (uploads) the input image to the server 30 (step S2). In a case where a single panel GO is divided into a plurality of sections which are photographed, for example, images of all the photographed sections are stored in a single folder, and the folder is transmitted.

The server 30 receives the image transmitted from the user terminal 20 (step S3). The received image is stored in the HDD 34.

The server 30 determines, based on the received image, the necessity of panoramic image synthesis (step S4). In a case where a plurality of images are received, the server 30 determines that panoramic image synthesis is necessary.

If the server 30 determines that panoramic image synthesis is necessary, the server 30 performs processing for panoramic image synthesis (step S5). As a result of panoramic image synthesis, a single captured image of the panel GO is obtained.

Then, the server 30 detects markings from the captured image of the panel GO (step S6). Markings are detected for each color.

Figure 11:
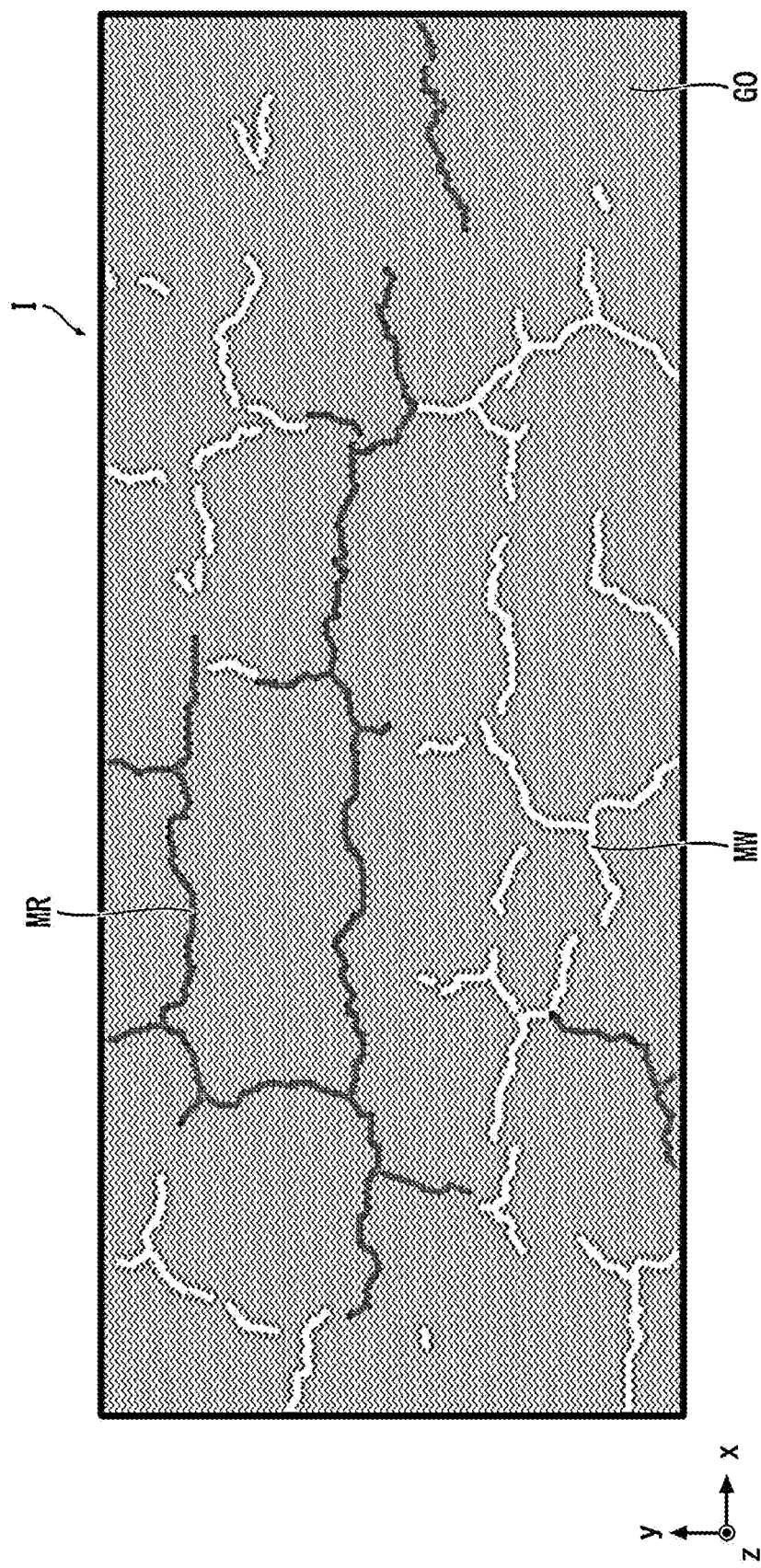
FIG. 11 is a diagram illustrating an example captured image of a panel, which is marked with chalk of a plurality of colors.

FIG. 11 is a diagram illustrating an example captured image of a panel, which is marked with chalk of a plurality of colors.

The panel GO appearing in an image I illustrated in FIG. 11 is marked with chalk of two colors according to the degree of damage. Specifically, a crack with a cracking width of less than 0.2 mm is marked with white chalk, and a crack with a cracking width of 0.2 mm or more is marked with red chalk. In FIG. 11, symbol MR indicates a marking made with red chalk. Symbol MW indicates a marking made with white chalk. The server 30 analyzes the image I and detects markings for each color.

Figure 12:
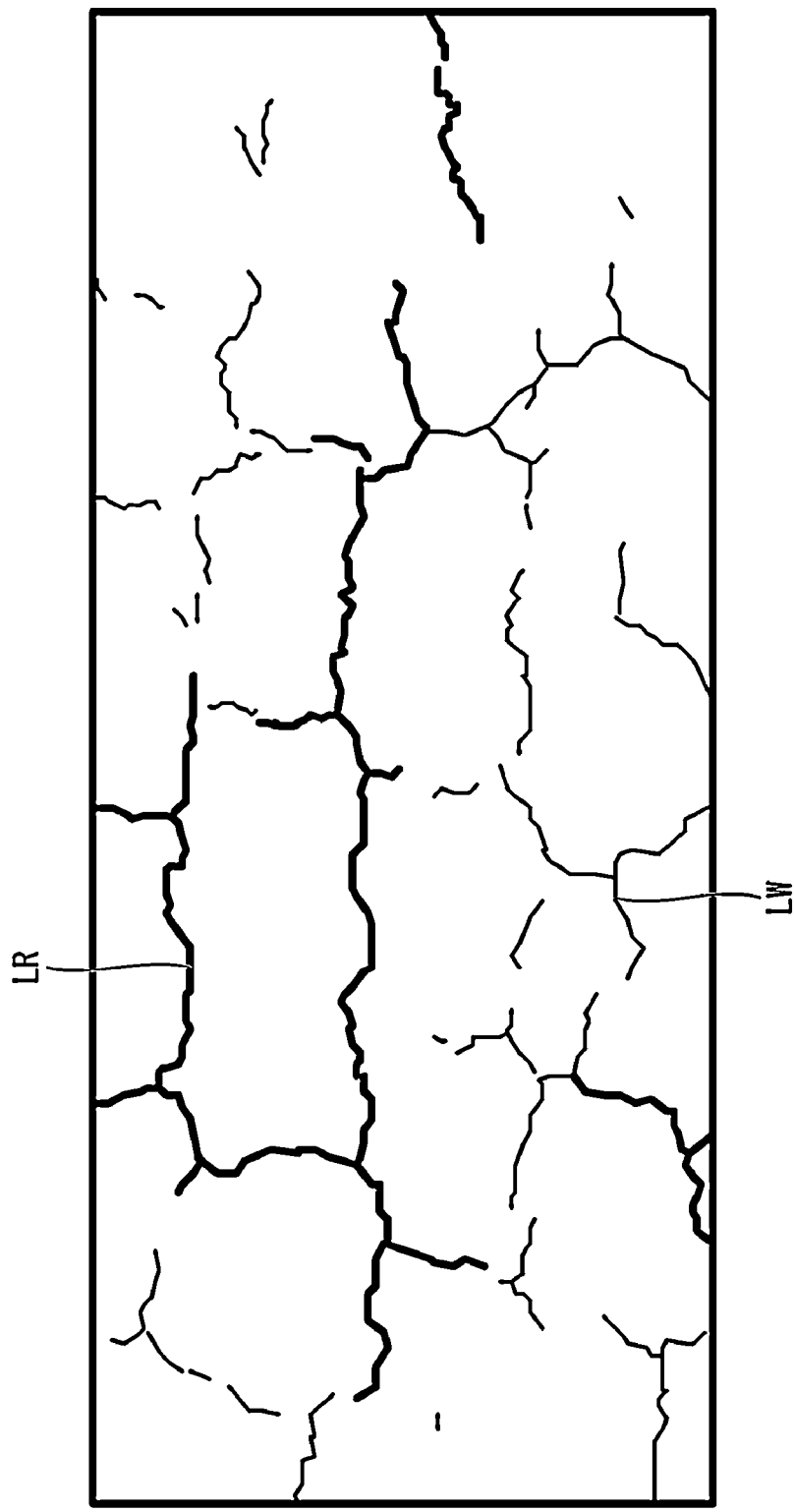
FIG. 12 is a diagram illustrating detection results of markings.

FIG. 12 is a diagram illustrating detection results of markings.

In FIG. 12, detected markings are traced by lines. In FIG. 12, symbol LR indicates a line tracing a marking detected as a red marking. Symbol LW indicates a line tracing a marking detected as a white marking. In FIG. 12, for convenience of easy distinction, lines LR tracing red markings are indicated by thick lines, and lines LW tracing white markings are indicated by thin lines.

After detection of markings, as illustrated in FIG. 10, the server 30 creates a damage figure on the basis of the detection results (step S7). The damage figure is created as a diagram of tracing markings detected from the image. In this embodiment, a damage figure having a layered structure in which markings are classified by color is created.

Figure 13:
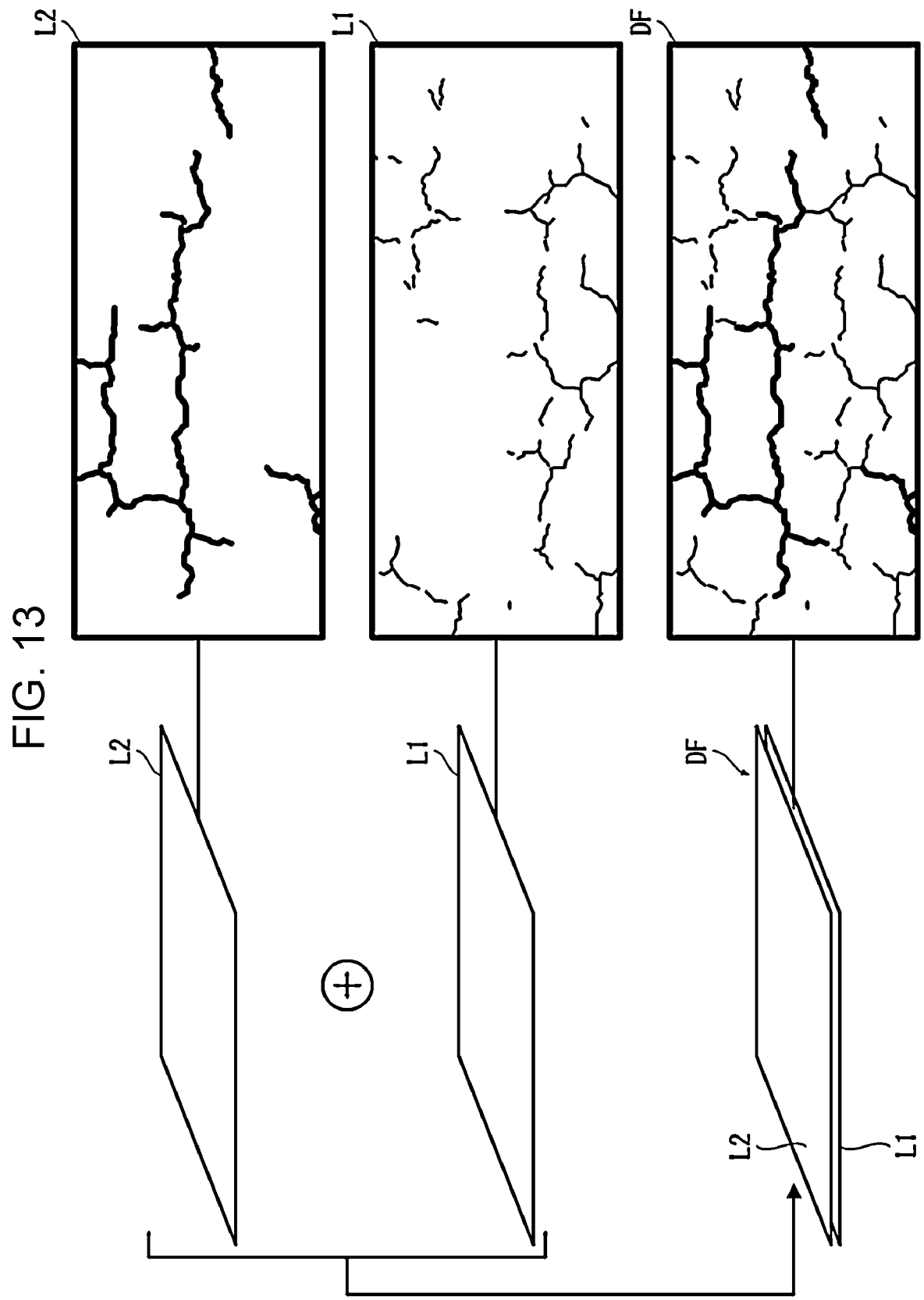
FIG. 13 is a diagram illustrating an example damage figure.

FIG. 13 is a diagram illustrating an example damage figure.

FIG. 13 illustrates an example damage figure of a panel marked with two colors of white and red. In this case, a damage figure DF including a first layer L1 and a second layer L2 is created. The first layer L1 is configured as a damage figure of tracing white markings. The second layer L2 is configured as a damage figure of tracing red markings. The damage figure DF is configured as a diagram obtained by superimposing the first layer L1 and the second layer L2 one on another.

It is preferable to use a different line type and/or a different color for lines tracing markings in each layer to distinguish between layers when the layers are made to overlap each other. For example, the same colors as the detected colors can be used.

As described above, the damage figure DF configured as a layered structure with layers corresponding to respective colors allows markings applied to an inspection location (in this example, a panel) to be checked color by color.

After the creation of a damage figure, as illustrated in FIG. 10, the server 30 transmits the created damage figure to the user terminal 20 (step S8).

The user terminal 20 receives (downloads) the damage figure transmitted from the server 30 as a processing result (step S9). Then, the user terminal 20 outputs the received damage figure to the output device 27 (step S10). Specifically, the damage figure is displayed on the display that is the output device 27. Further, the user terminal 20 records the received damage figure in the HDD 24 (step S11). At this time, the user terminal 20 records the damage figure in association with photograph data from which the damage figure is created.

Through the series of steps described above, damage figure creation processing based on a captured image is completed. The user (inspection engineer) creates a report of the inspection result on the basis of the acquired damage figure. Since data of damage figures for respective marking colors is obtained, it is possible to efficiently create a report or the like if each of the marking colors is given a meaning. For example, when marking is performed using different colors of chalk according to the degree of damage, damage figures according to degrees of damage are individually obtained (layers are switched to obtain a damage figure for each of the degrees of damage). In some cases, marking may be performed using different colors of chalk for respective colors of concrete. For example, chalk of an outstanding color may be selected for a color of concrete to perform marking (for example, marking is performed using red chalk on whitish concrete, white chalk on blackish concrete, and the like). In this case, a damage figure obtained by superimposing layers one on another is used. As a result, it is possible to create a damage figure without being affected by color. During marking, on the other hand, a marking operation can be efficiently performed without being affected by the color of concrete. During detection of markings from an image, markings can be accurately detected.

Second Embodiment

In this embodiment, a description will be given of creation of a damage figure in which damage is automatically classified by using information on marking colors.

A damage figure creation supporting system according to this embodiment acquires, from a user, information on the respective meanings of colors of markings made in different colors, and creates a damage figure in which damage information is classified using the information on the respective meanings of the colors.

[User Terminal]

Figure 14:
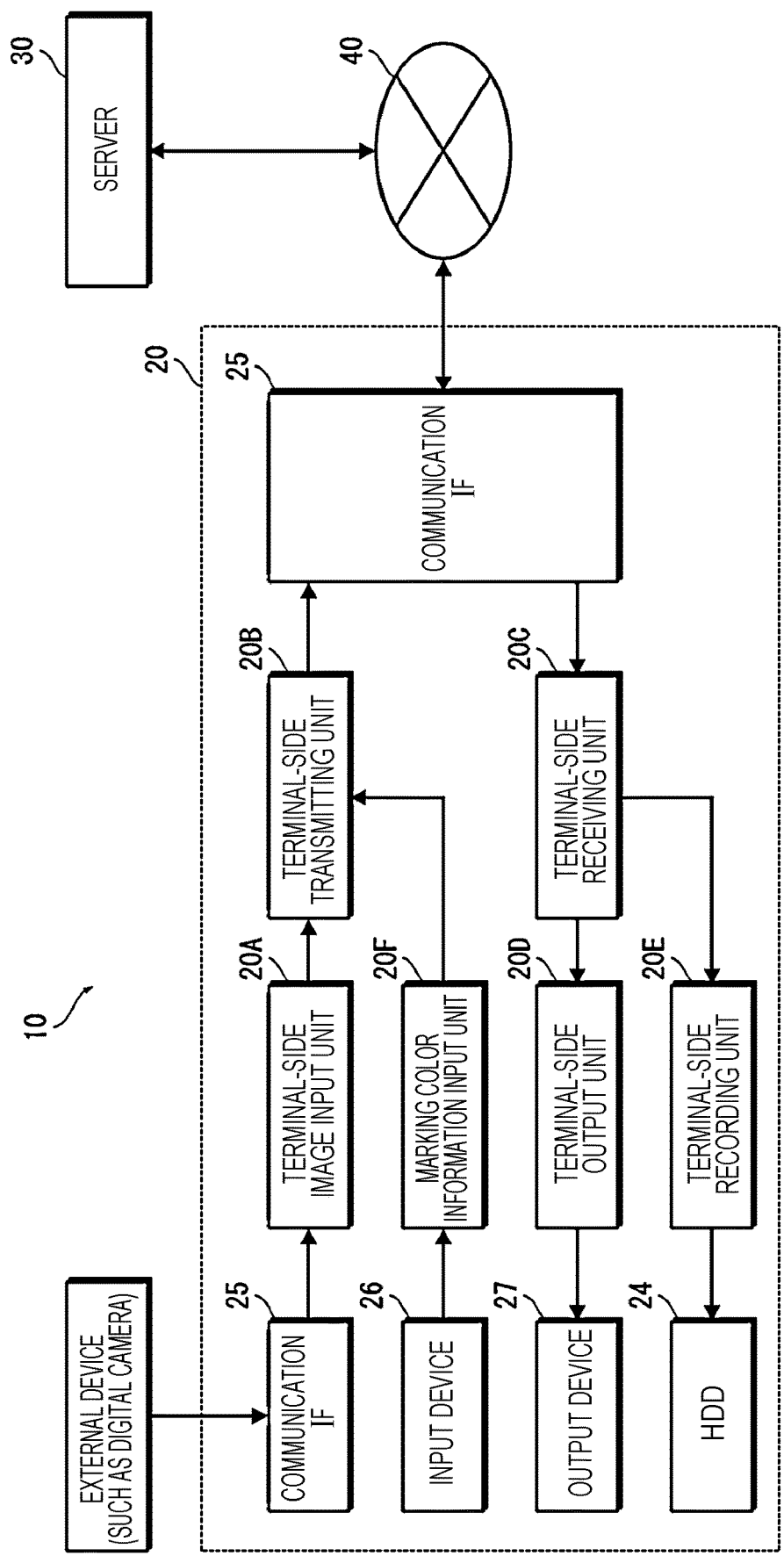
FIG. 14 is a block diagram of main functions that a user terminal in the damage figure creation supporting system according to a second embodiment has.

FIG. 14 is a block diagram of main functions that a user terminal in a damage figure creation supporting system according to this embodiment has.

As illustrated in FIG. 14, a user terminal 20 according to this embodiment further has a function of a marking color information input unit 20F, unlike the user terminal 20 in the damage figure creation supporting system 10 according to the first embodiment described above. Only differences will be described.

In a case where markings are made in different colors, the marking color information input unit 20F performs a process of accepting input of information on the respective meanings of the colors of the markings (marking color information). The information on the respective meanings of the colors of the markings is input to the marking color information input unit 20F via the input device 26. For example, when a crack with a cracking width of less than 0.2 mm is marked with white chalk and a crack with a cracking width of 0.2 mm or more is marked with red chalk, information indicating that "white" represents "a crack with a cracking width of less than 0.2 mm" and "red" represents "a crack with a cracking width of 0.2 mm or more" is input.

When transmitting the input image to the server 30, the terminal-side transmitting unit 20B also transmits the marking color information to the server 30 at the same time.

[Server]

Figure 15:
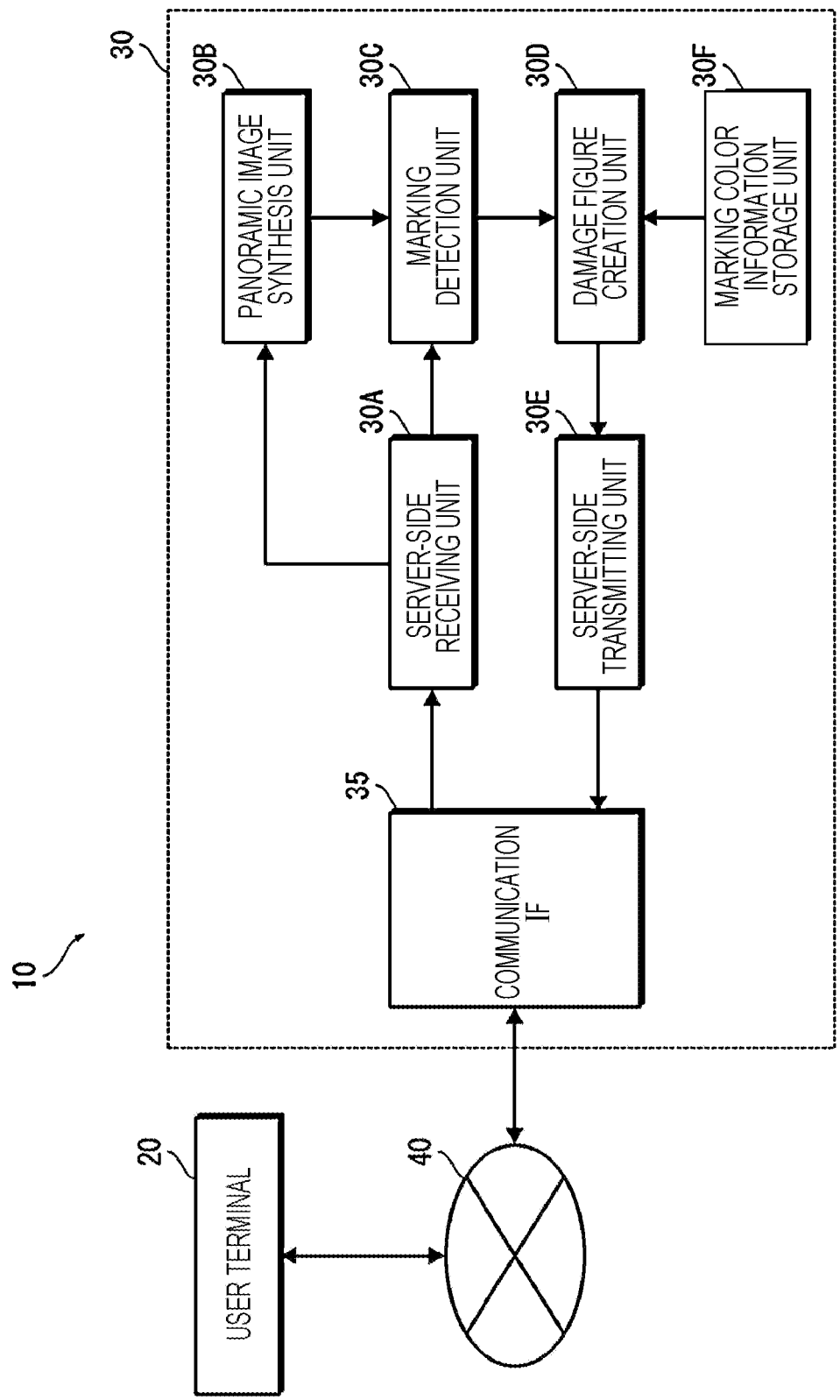
FIG. 15 is a block diagram of main functions that a server in the damage figure creation supporting system according to the second embodiment has.

FIG. 15 is a block diagram of main functions that a server in the damage figure creation supporting system according to this embodiment has.

As illustrated in FIG. 15, the server 30 (damage figure creation apparatus) according to this embodiment further has a function of a marking color information storage unit 30F, unlike the server 30 of the damage figure creation supporting system 10 according to the first embodiment described above. Only differences will be described.

The marking color information transmitted from the user terminal 20 is received by the server-side receiving unit 30A and is stored in the marking color information storage unit 30F. The marking color information storage unit 30F is constituted by, for example, the HDD 34.

When creating a damage figure, the damage figure creation unit 30D refers to the information stored in the marking color information storage unit 30F and creates a damage figure in which damage information is classified.

[Example Creation of Damage Figure]

(1) Case where Different Marking Colors are Used According to Degree of Damage

In this case, a damage figure in which damage information is classified according to the degree of damage is created. A user inputs information on degrees of damage for respective colors (marking color information) to the user terminal 20. The input marking color information is transmitted to the server 30 and is stored in the marking color information storage unit 30F of the server 30. The server 30 refers to the marking color information and creates a damage figure in which damage information is classified according to the degree of damage.

(A) Case where Different Marking Colors are Used According to Degree of Cracking In this case, a color of chalk to be used is selected in accordance with the degree of cracking. For example, a crack with a cracking width of less than 0.2 mm is marked with white chalk, and a crack with a cracking width of 0.2 mm or more is marked with red chalk. The user inputs the colors of chalk used (marking colors) and information on the respective meanings of the colors (information on the degrees of cracking) to the user terminal 20. For example, information indicating that "white" represents "a crack with a cracking width of less than 0.2 mm" and "red" represents "a crack with a cracking width of 0.2 mm or more" is input to the user terminal 20.

As described above, markings are detected for each color. The server 30 creates a damage figure on the basis of detection results of the markings for the respective colors and information on the colors of the markings. For example, the server 30 creates, as the damage figure, a damage figure having a layered structure in which damage information is classified according to the degree of damage.

FIG. 16 is a diagram illustrating an example damage figure in which damage information is classified according to the degree of cracking.

FIG. 16 illustrates an example damage figure of a panel in which a crack with a cracking width of less than 0.2 mm is marked with white chalk and a crack with a cracking width of 0.2 mm or more is marked with red chalk. In this case, a damage figure DF including a first layer L1 and a second layer L2 is created. The first layer L1 is configured as a damage figure in which cracks with a cracking width of less than 0.2 mm are marked. This damage figure is configured as a damage figure of tracing white markings. The second layer L2 is configured as a damage figure in which cracks with a cracking width of 0.2 mm or more are marked. This damage figure is configured as a damage figure of tracing red markings. The damage figure DF is configured as a diagram obtained by superimposing the first layer L1 and the second layer L2 one on another.

Each layer is assigned the classified damage information. For example, the first layer L1 is assigned information If1 indicating detection results of cracks with a cracking width of less than 0.2 mm. The second layer L2 is assigned information If2 indicating detection results of cracks with a cracking width of 0.2 mm or more. The damage figure DF, which is formed by superimposing the first layer L1 and the second layer L2 one on another, is assigned information If0 indicating detection results of all the cracks.

It is preferable to use a different line type and/or a different color for lines tracing markings in each layer to distinguish between layers when the layers are made to overlap each other. For example, the same colors as the detected colors can be used.

According to this example, in a case where different marking colors are used according to the degree of cracking, a damage figure in which damage information is automatically classified by the degree of cracking can be created by using information on the marking colors. As a result, it is possible to efficiently create an inspection report.

As for cracks, alternatively, damage may be evaluated according to a predetermined evaluation criterion, and marking may be performed using different colors according to the evaluation. In this case, based on detection results of markings detected for each color, a damage figure in which damage information is classified by color (a layered damage figure, each layer corresponding to a color) is created. Accordingly, a damage figure in which damage information is classified according to the evaluation criterion can be automatically created. As the determination criterion, a uniquely determined criterion, as well as a criterion determined by a country, a local government, a company, and the like, can be used. For example, inspection of a bridge can be performed using criteria specified in the guidelines for periodic inspection of bridges defined by the Ministry of Land, Infrastructure, Transport and Tourism of Japan.

FIG. 17 includes tables illustrating example evaluation criteria for cracks.

In the example illustrated in FIG. 17, the degree of damage due to cracks is evaluated in five stages (a, b, c, d, and e) by using, in combination, degrees (large, medium, and small) focusing on the maximum cracking width and degrees (large and small) focusing on the minimum cracking interval.

When marking is performed, different colors of chalk are used according to the evaluation class (a, b, c, d, and e). For example, a damaged portion for Class b is marked with white chalk, a damaged portion for Class c is marked with blue chalk, a damaged portion for Class d is marked with yellow chalk, and a damaged portion for Class e is marked with red chalk.

In a case where a damage figure is created, a damage figure in which damage information is classified by marking color is created. As a result, it is possible to automatically create a damage figure in which damage information is classified by evaluation class.

(B) Case where Different Marking Colors are Used According to Degree of Water Leakage In this case, a color of chalk to be used is selected in accordance with the degree of water leakage. For example, a normal water leakage portion is marked with white chalk, and a water leakage portion with rust fluid is marked with red chalk. The user inputs the colors of chalk used (marking colors) and information on the respective meanings of the colors (information on the degrees of water leakage) to the user terminal 20. For example, information indicating that "white" represents "normal water leakage" and "red" represents "water leakage with rust fluid" is input to the user terminal 20.

The server 30 creates a damage figure having a layered structure in which damage information is classified by the degree of water leakage on the basis of detection results of the markings for the respective colors and information on the colors of the markings.

Figure 18:
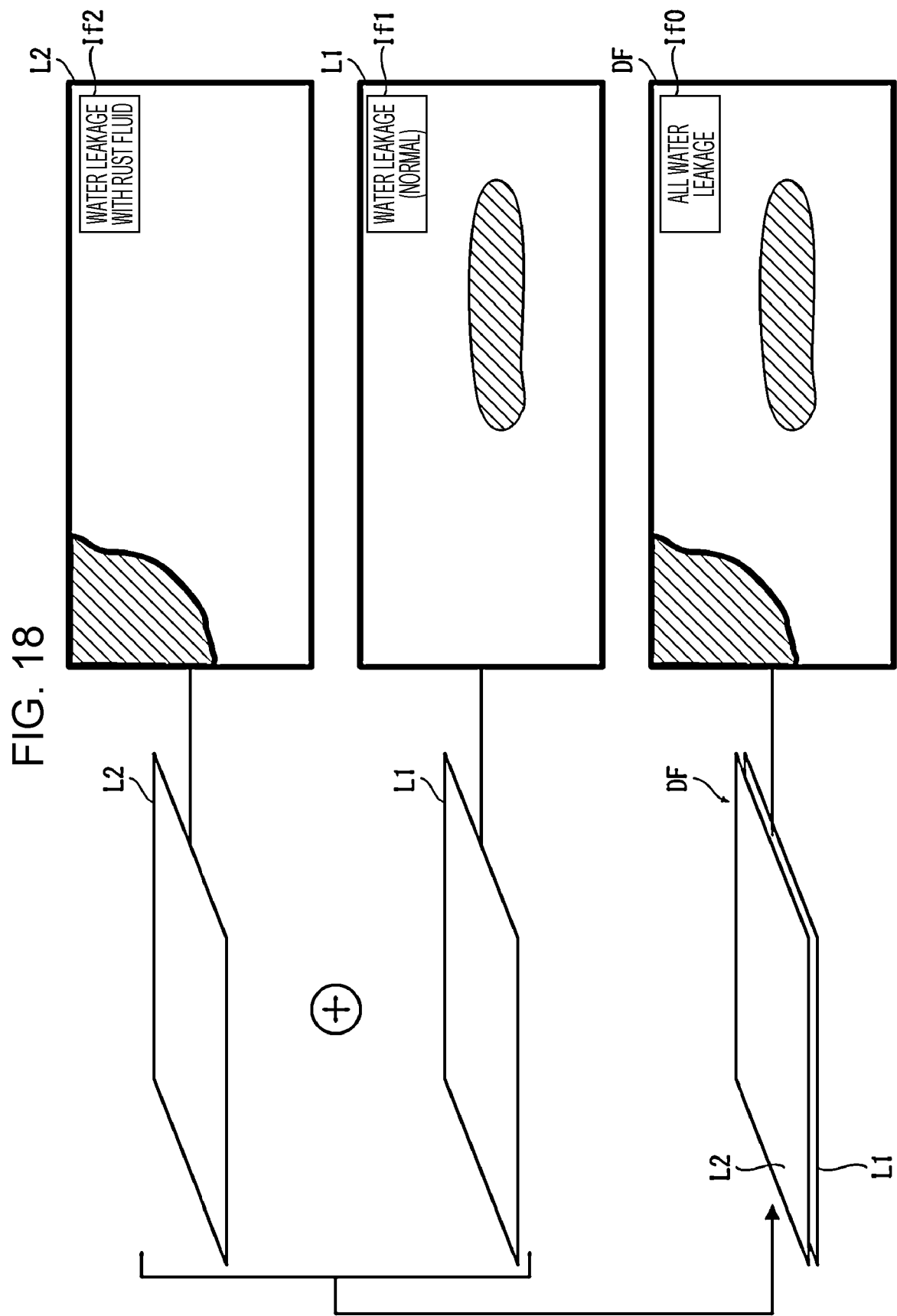
FIG. 18 is a diagram illustrating an example damage figure in which damage information is classified according to the degree of water leakage.

FIG. 18 is a diagram illustrating an example damage figure in which damage information is classified according to the degree of water leakage.

FIG. 18 illustrates an example damage figure of a panel in which a normal water leakage portion is marked with white chalk and a water leakage portion with rust fluid is marked with red chalk. In this case, a damage figure DF including a first layer L1 and a second layer L2 is created. The first layer L1 is configured as a damage figure in which a normal water leakage portion is marked. This damage figure is configured as a damage figure of tracing a white marking. The second layer L2 is configured as a damage figure in which a water leakage portion with rust fluid is marked. This damage figure is configured as a damage figure of tracing a red marking. The damage figure DF is configured as a diagram obtained by superimposing the first layer L1 and the second layer L2 one on another.

Each layer is assigned the classified damage information. For example, the first layer L1 is assigned information If1 indicating normal water leakage. The second layer L2 is assigned information If2 indicating water leakage with rust fluid. The damage figure DF, which is formed by superimposing the first layer L1 and the second layer L2 one on another, is assigned information If0 indicating detection results of all the water leakage portions.

According to this example, in a case where different marking colors are used according to the degree of water leakage, a damage figure in which damage information is automatically classified by the degree of water leakage can be created by using information on the marking colors. As a result, it is possible to efficiently create an inspection report.

(C) Case where Different Marking Colors are Used According to Degree of Free Lime In this case, a color of chalk to be used is selected in accordance with the degree of free lime. For example, a normal free lime portion is marked with white chalk, and a portion of free lime with rust fluid and icicle-like free lime is marked with red chalk. The user inputs the colors of chalk used (marking colors) and information on the respective meanings of the colors (information on the degrees of free lime) to the user terminal 20. For example, information indicating that "white" represents "normal free lime" and "red" represents "free lime with rust fluid and icicle-like free lime" is input to the user terminal 20.

The server 30 creates a damage figure having a layered structure in which damage information is classified by the degree of free lime on the basis of detection results of the markings for the respective colors and information on the colors of the markings.

FIG. 19 is a diagram illustrating an example damage figure in which damage information is classified according to the degree of free lime.

FIG. 19 illustrates an example damage figure of a panel in which a normal free lime portion is marked with white chalk and a portion of free lime with rust fluid and icicle-like free lime is marked with red chalk. In this case, a damage figure DF including a first layer L1 and a second layer L2 is created. The first layer L1 is configured as a damage figure in which a normal free lime portion is marked. This damage figure is configured as a damage figure of tracing a white marking. The second layer L2 is configured as a damage figure in which a portion of free lime with rust fluid and icicle-like free lime is marked. This damage figure is configured as a damage figure of tracing a red marking. The damage figure DF is configured as a diagram obtained by superimposing the first layer L1 and the second layer L2 one on another.

Each layer is assigned the classified damage information. For example, the first layer L1 is assigned information If1 indicating normal free lime. The second layer L2 is assigned information If2 indicating free lime with rust fluid and icicle-like free lime. The damage figure DF, which is formed by superimposing the first layer L1 and the second layer L2 one on another, is assigned information If0 indicating detection results of all the free lime portions.

According to this example, in a case where different marking colors are used according to the degree of free lime, a damage figure in which damage information is automatically classified by the degree of free lime can be created by using information on the marking colors. As a result, it is possible to efficiently create an inspection report.

As for water leakage and free lime, damage may also be evaluated according to a predetermined evaluation criterion, and marking may be performed using different colors according to the evaluation. In this case, based on detection results of markings detected for each color, a damage figure in which damage information is classified by color (a layered damage figure, each layer corresponding to a color) is created. Accordingly, a damage figure in which damage information is classified according to the evaluation criterion can be automatically created.

FIG. 20 is a table illustrating example evaluation criteria for water leakage and free lime.

In the example illustrated in FIG. 20, the degree of damage is evaluated in five stages (a, b, c, d, and e) in accordance with the occurrence of water leakage and free lime.

When marking is performed, different colors of chalk are used according to the evaluation class (a, b, c, d, and e). For example, a damaged portion for Class c is marked with white chalk, a damaged portion for Class d is marked with yellow chalk, and a damaged portion for Class e is marked with red chalk.

In a case where a damage figure is created, a damage figure in which damage information is classified by marking color is created. As a result, it is possible to automatically create a damage figure in which damage information is classified by evaluation class.

(D) Case where Different Marking Colors are Used According to Degree of Peeling and Degree of Exposure of Steel Reinforcement In this case, a color of chalk to be used is selected in accordance with the degree of peeling and the degree of exposure of steel reinforcement. For example, a portion with exposure of normal steel reinforcement is marked with white chalk, and a portion with exposure of severely rusted steel reinforcement is marked with red chalk. The user inputs the colors of chalk used (marking colors) and information on the respective meanings of the colors (information on the degrees of exposure of steel reinforcement) to the user terminal 20. For example, information indicating that "white" represents "exposure of normal steel reinforcement" and "red" represents "exposure of severely rusted steel reinforcement" is input to the user terminal 20.

The server 30 creates a damage figure having a layered structure in which damage information is classified by the degree of exposure of steel reinforcement on the basis of detection results of the markings for the respective colors and information on the colors of the markings.

Figure 21:
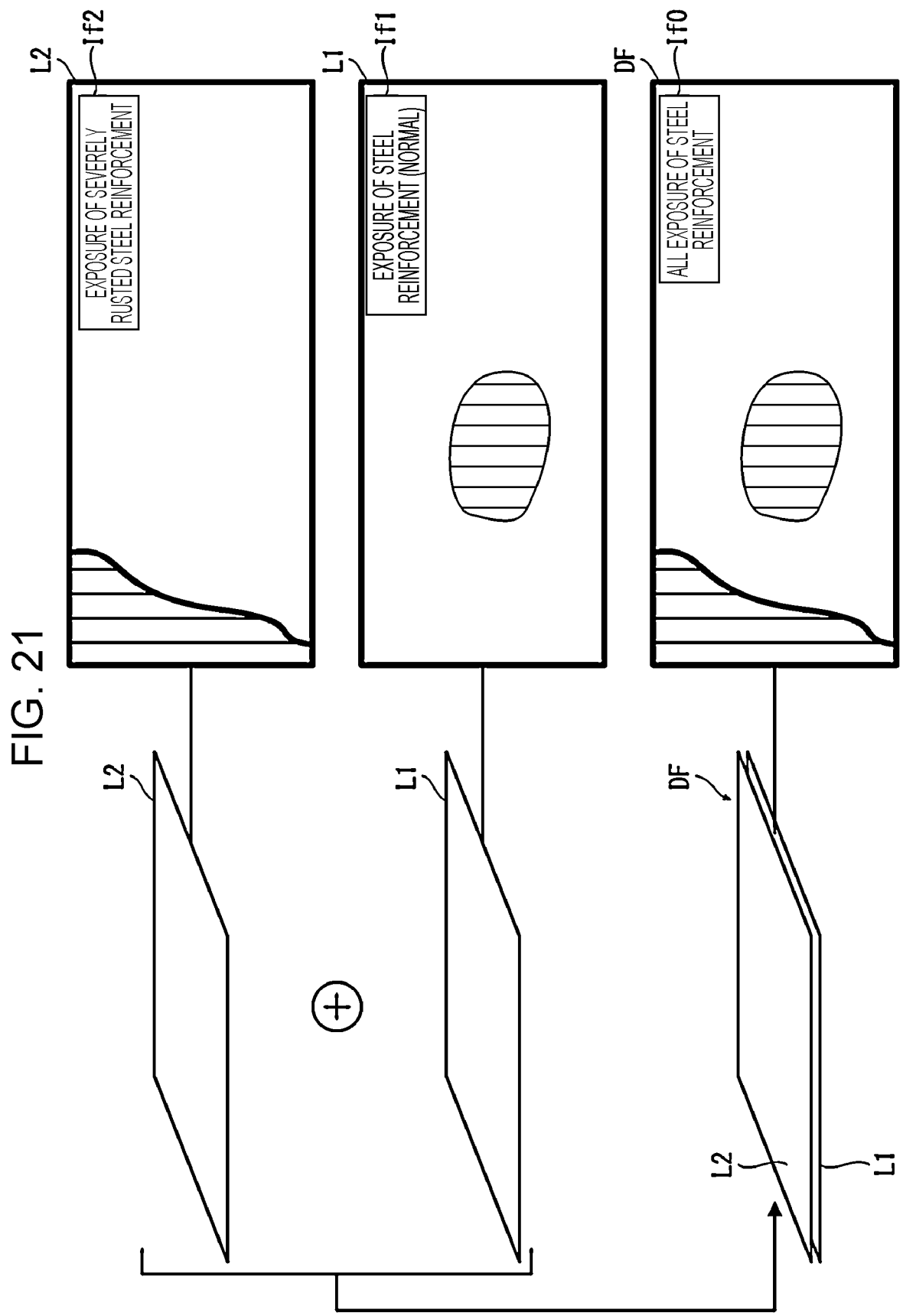
FIG. 21 is a diagram illustrating an example damage figure in which damage information is classified according to the degree of exposure of steel reinforcement.

FIG. 21 is a diagram illustrating an example damage figure in which damage information is classified according to the degree of exposure of steel reinforcement.

FIG. 21 illustrates an example damage figure of a panel in which a portion with exposure of normal steel reinforcement is marked with white chalk and a portion with exposure of severely rusted steel reinforcement is marked with red chalk. In this case, a damage figure DF including a first layer L1 and a second layer L2 is created. The first layer L1 is configured as a damage figure in which a portion with exposure of normal steel reinforcement is marked. This damage figure is configured as a damage figure of tracing a white marking. The second layer L2 is configured as a damage figure in which a portion with exposure of severely rusted steel reinforcement is marked. This damage figure is configured as a damage figure of tracing a red marking. The damage figure DF is configured as a diagram obtained by superimposing the first layer L1 and the second layer L2 one on another.

Each layer is assigned the classified damage information. For example, the first layer L1 is assigned information If1 indicating exposure of normal steel reinforcement. The second layer L2 is assigned information If2 indicating exposure of severely rusted steel reinforcement. The damage figure DF, which is formed by superimposing the first layer L1 and the second layer L2 one on another, is assigned information If0 indicating detection results of all the portions with exposure of steel reinforcement.

According to this example, in a case where different marking colors are used according to the degree of exposure of steel reinforcement, a damage figure in which damage information is automatically classified by the degree of exposure of steel reinforcement can be created by using information on the marking colors. As a result, it is possible to efficiently create an inspection report.

As for peeling and exposure of steel reinforcement, damage may also be evaluated according to a predetermined evaluation criterion, and marking may be performed using different colors according to the evaluation. In this case, based on detection results of markings detected for each color, a damage figure in which damage information is classified by color (a layered damage figure, each layer corresponding to a color) is created. Accordingly, a damage figure in which damage information is classified according to the evaluation criterion can be automatically created.

FIG. 22 is a table illustrating example evaluation criteria for peeling and exposure of steel reinforcement.

In the example illustrated in FIG. 22, the degree of damage is evaluated in five stages (a, b, c, d, and e) in accordance with the occurrence of peeling and exposure of steel reinforcement.

When marking is performed, different colors of chalk are used according to the evaluation class (a, b, c, d, and e). For example, a damaged portion for Class c is marked with white chalk, a damaged portion for Class d is marked with yellow chalk, and a damaged portion for Class e is marked with red chalk.

In a case where a damage figure is created, a damage figure in which damage information is classified by marking color is created. As a result, it is possible to automatically create a damage figure in which damage information is classified by evaluation class.

(2) Case where Different Marking Colors are Used According to Type of Damage

In this case, a damage figure is created in which damage information is classified according to the type of damage. A user inputs information on types of damage for respective colors (marking color information) to the user terminal 20. The input marking color information is transmitted to the server 30 and is stored in the marking color information storage unit 30F of the server 30. The server 30 refers to the marking color information and creates a damage figure in which damage information is classified according to the type of damage.

For example, cracks are marked with white chalk, water leakage is marked with blue chalk, free lime is marked with green chalk, peeling is marked with yellow chalk, and exposure of steel reinforcement is marked with red chalk. The user inputs the colors of chalk used (marking colors) and information on the types of damage for the respective colors to the user terminal 20. For example, information indicating that "white" represents "cracks", "blue" represents "water leakage", "green" represents "free lime", "yellow" represents "peeling", and "red" represents "exposure of steel reinforcement" is input to the user terminal 20.

The server 30 creates a damage figure on the basis of detection results of the markings for the respective colors and information on the colors of the markings. The server 30 creates, as the damage figure, a damage figure having a layered structure in which damage information is classified by the degree of damage.

Figure 23:
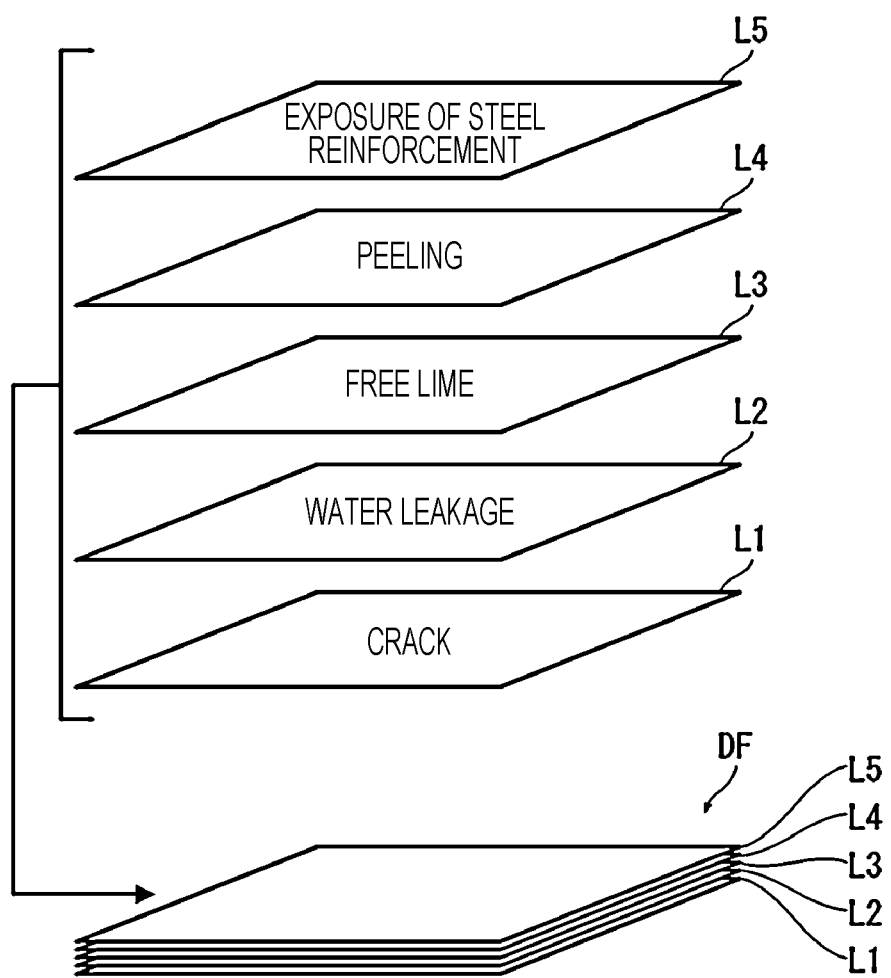
FIG. 23 is a diagram illustrating an example configuration of a damage figure.

FIG. 23 is a diagram illustrating an example configuration of a damage figure.

FIG. 23 illustrates an example configuration of a damage figure when a crack portion is marked with white chalk, a water leakage portion is marked with blue chalk, a free lime portion is marked with green chalk, a peeling portion is marked with yellow chalk, and a portion with exposure of steel reinforcement is marked with red chalk. In this case, the damage figure DF including five layers (first layer L1 to fifth layer L5) is created. The first layer L1 is configured as a damage figure in which cracks are marked. This damage figure is configured as a damage figure of tracing white markings. The second layer L2 is configured as a damage figure in which water leakage portions are marked. This damage figure is configured as a damage figure of tracing blue markings. The third layer L3 is configured as a damage figure in which free lime portions are marked. This damage figure is configured as a damage figure of tracing green markings. The fourth layer L4 is configured as a damage figure in which peeling portions are marked. This damage figure is configured as a damage figure of tracing yellow markings. The fifth layer L5 is configured as a damage figure in which portions with exposure of steel reinforcement are marked. This damage figure is configured as a damage figure of tracing red markings. The entire damage figure DF is configured as a diagram obtained by superimposing all the layers one on another.

As described above, each layer is assigned the classified damage information. In addition, it is preferable to use a different line type and/or a different color for lines tracing markings in each layer to distinguish between layers when the layers are made to overlap each other. For example, the same colors as the detected colors can be used. Alternatively, display may be performed in accordance with a preset display rule.

FIG. 24 is a diagram illustrating an example manner of displaying damage on a damage figure.

As illustrated in FIG. 24, manners of displaying damage on a damage figure for the respective types of damage are set, and damage is displayed on the damage figure in accordance with the settings. For example, when a marking for water leakage (in this example, a blue marking) is detected, the location of the marking is displayed with hatching on the damage figure.

In a case where damage is presented in the manner described above on the damage figure in accordance with a preset display rule, notes may be displayed on or attached to the damage figure.

Figure 25:
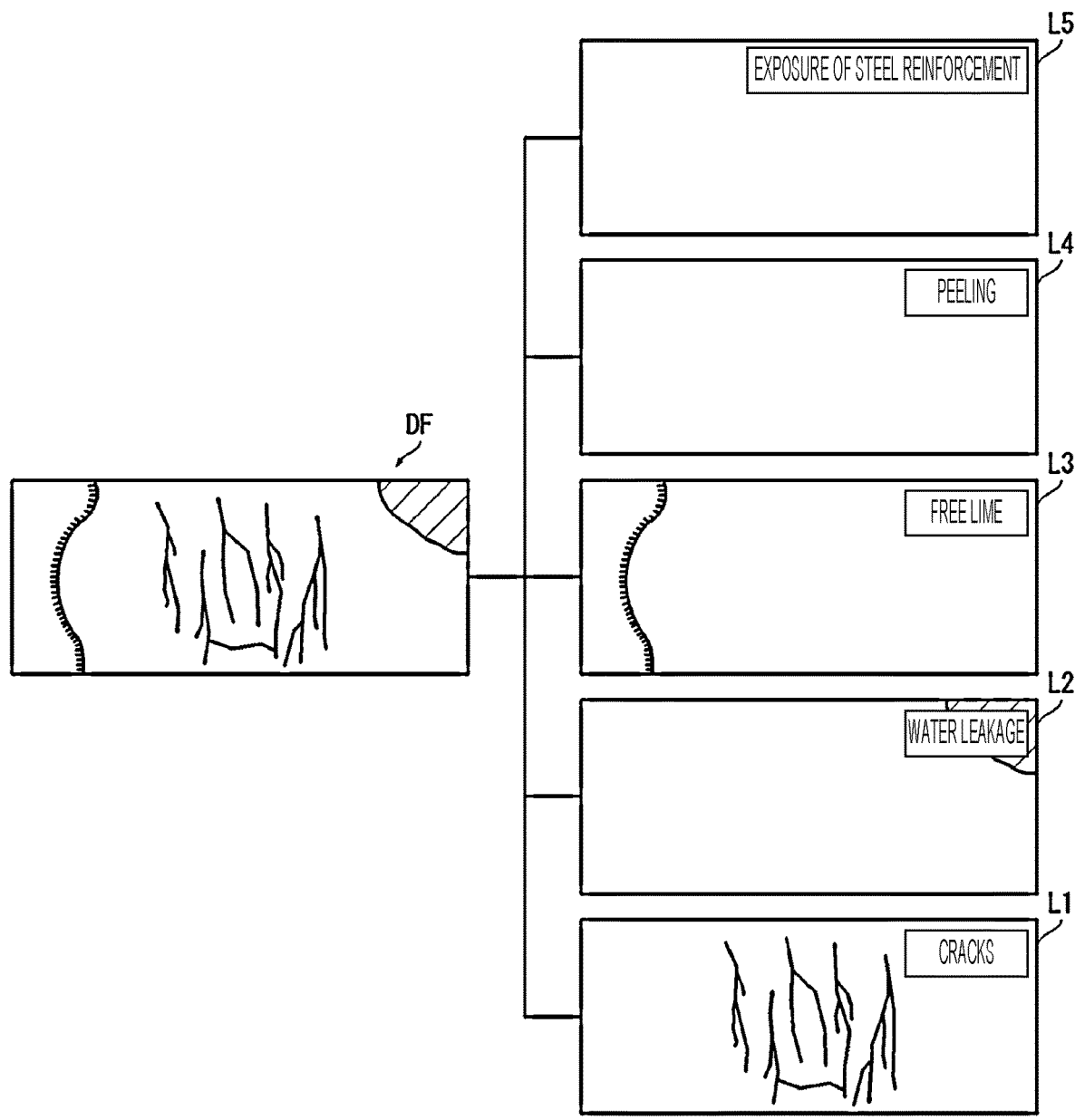
FIG. 25 is a diagram illustrating an example damage figure in which damage information is classified by damage type.

FIG. 25 is a diagram illustrating an example damage figure in which damage information is classified by damage type.

The example illustrated in FIG. 25 illustrates a damage figure created from a captured image of a panel in which cracks, water leakage, and free lime have occurred. In this case, as illustrated in FIG. 25, white markings applied to crack portions, a blue marking applied to a water leakage portion, and a green marking applied to a free lime portion are detected. As damage figures, the first layer L1, which is a damage figure of cracks, the second layer L2, which is a damage figure of water leakage, and the third layer L3, which is a damage figure of free, are created (the fourth layer L4, which is a damage figure of peeling, and the fifth layer L5, which is a damage figure of exposure of steel reinforcement, are blank (transparent) layers). The entire damage figure DF is a diagram in which all the damage is displayed.

According to this example, in a case where different marking colors are used according to the type of damage, a damage figure in which damage information is automatically classified by the type of damage can be created by using information on the marking colors. As a result, it is possible to efficiently create an inspection report.

(3) Case where Different Marking Colors are Used According to Inspection Time

Marking is performed using a different color of chalk for each inspection such that, for example, white chalk is used for the first inspection, red chalk is used for the next inspection, and blue chalk is used for the subsequent inspection. In this case, a damage figure is created in which damage information is classified according to inspection time. A user inputs information on inspection times for the respective colors (marking color information) to the user terminal 20. The input marking color information is transmitted to the server 30 and is stored in the marking color information storage unit 30F of the server 30. The server 30 refers to the marking color information and creates a damage figure in which damage information is classified according to the inspection time. For example, as the damage figure, a damage figure having a layered structure is created. That is, a damage figure having a stack of layers in which damage information is classified by inspection time is created.

FIG. 26 is a diagram illustrating an example configuration of a damage figure in which damage information is classified by inspection time.

FIG. 26 illustrates an example damage figure obtained through three inspections that have been performed so far. In the first inspection (Dec. 1, 2008), damaged portions are marked with white chalk. In the second inspection (Dec. 1, 2013), damaged portions are marked with red chalk. In the third inspection (Dec. 1, 2018), damaged portions are marked with blue chalk. In this case, a damage figure DF including three layers (a first layer L1 to a third layer L3) is created. The first layer L1 is configured as a damage figure obtained through the first inspection. This damage figure is configured as a damage figure of tracing white markings. The second layer L2 is configured as a damage figure obtained through the second inspection. This damage figure is configured as a damage figure of tracing red markings. The third layer L3 is configured as a damage figure obtained through the third inspection. This damage figure is configured as a damage figure of tracing blue markings. The entire damage figure DF is configured as a diagram obtained by superimposing all the layers one on another.

According to this example, in a case where different marking colors are used according to inspection time, a damage figure in which damage information is automatically classified by inspection time can be created by using information on the marking colors. As a result, it is possible to efficiently create an inspection report. In addition, creation of such a damage figure enables the observer to check the difference between the previous and current inspections (progression of damage).

Other Embodiments and Modifications

[Inspection Target]

While, in the embodiments described above, inspection of a bridge has been described as an example, the application of the present invention is not limited thereto. The present invention is also applicable to inspection of other structures such as tunnels, dams, and buildings. The structure to be inspected is not limited to a concrete structure and can also be applied to any other structure. The surface structure of an inspection location is not limited to concrete and may be formed by tiles or the like. The present invention is also applicable when a steel member of a structure is an inspection target. In a case where a steel member of a structure is included in an inspection target, different marking colors are used according to, for example, the degree of fracture, the degree of corrosion, and the degree of deterioration of anti-corrosion function of the steel member, the degree of loosening of a bolt, and the like. For example, fractures are marked such that (1) a coating film break confirmed in a cross-sectional sudden change portion, a welded joint portion, or the like and fractures generated, which are not linear or are linear, but are very short in length and the number of which is small, are marked with white chalk, and (2) a coating film break with a linear fracture or a coating film break with a suspected fracture immediately therebelow is marked with red chalk. For example, for corrosion, (1) when the depth of damage is small (when the rust is superficial and no significant reduction in thickness or the like is visible) and the area of damage is small (a damaged portion has a small area and is local), the damage is marked with white chalk, (2) when the depth of damage is small and the area of damage is large (a focused portion of damage is entirely rusted or the focused portion has a plurality of portions with wide-spread development of rust), the damage is marked with blue chalk, (3) when the depth of damage is large (the steel surface greatly expands or an apparent reduction in thickness or the like is visible) and the area of damage is large, the damage is marked with yellow chalk, and (4) when the depth of damage is large and the area of damage is large, the damage is marked with red chalk. For deterioration of anti-corrosion function, in the case of coating, for example, (1) a discolored portion or a local buildup of rust on the anti-corrosive coating film in the outermost layer is marked with white chalk, (2) an area with exposed undercoat of the anti-corrosive coating film due to partial peeling is marked with yellow chalk, and (3) a large area where the anti-corrosive coating film deteriorates and spot rusting has occurred is marked with red chalk. For deterioration of anti-corrosion function, furthermore, in the case of plating and metal spraying, (1) a local area where the anti-corrosive coating deteriorates and spot rusting has occurred is marked with white chalk, and (2) a large area where the anti-corrosive coating deteriorates and spot rusting has occurred is marked with red chalk. For deterioration of anti-corrosion function, furthermore, in the case of a weather-resistant steel material, (1) rough rust with a size of about 1 to 5 mm is marked with white chalk, (2) scaly rust with a size of about 5 to 25 mm is marked with yellow chalk, and (3) rust with layered peeling is marked with red chalk. Further, loosening of a bolt is marked such that (1) loosening or removal of bolts, the number of which is small (less than 5% of the number of bolts per group), is marked with white chalk, and (2) loosening, removal, and the like of bolts, the number of which is large (5% or more of the number of bolts per group), are marked with red chalk. When a damage figure is to be created, a damage figure is created in accordance with detection results for the respective colors of the markings detected from an image. That is, a damage figure is created in which damage is classified according to the degree of fracture, the degree of corrosion, the degree of deterioration of anti-corrosion function, and the like of the steel member, which are detected.

[System Configuration]

In the embodiments described above, the present invention is implemented as a so-called client-server system as a damage figure creation supporting system. Alternatively, the present invention may be implemented as, for example, a so-called stand-alone computer as a damage figure creation supporting system.

[Marking Operation]

In the embodiments described above, the case of performing marking using chalk has been described as an example. However, a marking operation can be performed using a marker such as a felt-tipped pen (marking pen). It is sufficient that different colors be used.

In the embodiments described above, the case of individually performing inspection and marking of cracks, water leakage, free lime, peeling, exposure of steel reinforcement, and the like has been described as an example. However, these operations can be performed in a complex manner. For example, inspection and marking of cracks and water leakage can be simultaneously performed. In this case, marking can be performed using different colors of chalk in accordance with the degree of cracking and the degree of water leakage. Alternatively, marking can be performed using different colors of chalk at the same time in accordance with the type of damage. As a result, it is possible to create a damage figure in which damage information is classified according to the degree and type of damage.

[Input of Marking Color Information]

In the embodiments described above, a user inputs information on respective marking colors to the user terminal 20. When information on respective marking colors is determined in advance (for example, when an inspection engineer performs marking in accordance with a rule of using predetermined colors), the server 30 may hold the information (in the HDD 34 (storage unit) or the like), refer to the information, and create a damage figure.

[Configuration of Damage Figure]

While, in the embodiments described above, a damage figure having a layered structure with layers separable by marking color is created, the configuration of the damage figure is not limited thereto. Individual damage figures may be created for respective marking colors. Alternatively, a single damage figure may be created in such a manner that portions of the damage figure are separable by marking color (for example, portions are grouped for each marking color such that display and non-display of each group can be switched for each marking color).

[Modifications of Hardware Configuration]

Hardware implementing a damage figure creation supporting apparatus according to the present invention may be implemented by various processors. The various processors include a CPU (Central Processing Unit), which is a general-purpose processor configured to execute a program to function as various processing units, a programmable logic device (PLD) such as an FPGA (Field Programmable Gate Array), which is a processor whose circuit configuration is changeable after manufacture, a dedicated electric circuit, which is a processor having a circuit configuration specifically designed to execute specific processing, such as an ASIC (Application Specific Integrated Circuit), and so on. A single processing unit constituting a damage figure creation supporting apparatus may be configured by one of the various processors described above or by two or more processors of the same type or different types. For example, a single processing unit may be configured by a plurality of FPGAs or a combination of a CPU and an FPGA. Alternatively, a plurality of processing units may be configured by a single processor. Examples of configuring a plurality of processing units by a single processor include, first, a form in which, as typified by a computer such as a client or server computer, the single processor is configured by a combination of one or more CPUs and software and the processor functions as the plurality of processing units. The examples include, second, a form in which, as typified by a system on chip (SoC) or the like, a processor is used in which the functions of the entire system including the plurality of processing units are implemented by a single IC (Integrated Circuit) chip. As described above, the various processing units are configured using one or more of the various processors described above as a hardware structure. The hardware structure of the various processors is more specifically an electric circuit (circuitry) made by a combination of circuit elements such as semiconductor elements.

REFERENCE SIGNS LIST 1 bridge
2 main girder
3 cross beam
4 cross frame
5 lateral bracing
6 deck slab
10 damage figure creation supporting system
20 user terminal
20A terminal-side image input unit
20B terminal-side transmitting unit
20C terminal-side receiving unit
20D terminal-side output unit
20E terminal-side recording unit
20F marking color information input unit
21 CPU (Central Processing Unit)
22 RAM (Random Access Memory)
23 ROM (Read Only Memory)
24 HDD (Hard Disk Drive)
25 communication IF (Interface)
26 input device
27 output device
28 optical disk drive
30 server
30A server-side receiving unit
30B panoramic image synthesis unit
30C marking detection unit
30D damage figure creation unit
30E server-side transmitting unit
30F marking color information storage unit
31 CPU (Central Processing Unit)
32 RAM (Random Access Memory)
33 ROM (Read Only Memory)
34 HDD (Hard Disk Drive)
35 communication IF (Interface)
36 input device
37 output device
38 optical disk drive
40 network
DF damage figure
G0 panel
I image
If0 information
If1 information
If2 information
L1 first layer
L2 second layer
L3 third layer
L4 fourth layer
L5 fifth layer
S1 to S11 processing procedure to create damage figure

What is claimed is:

1. A damage figure creation supporting apparatus comprising a processor configured to:
   acquire an image obtained by photographing a surface of a structure in color, the surface being applied with markings by drawing lines along cracks appearing on the surface, colors of the markings corresponding to widths of the cracks;
   analyze the image and detect the markings applied on the surface of the structure for respective colors;
   receive marking color information on the widths of the cracks respectively defined for the colors of the markings input from a user;
   store the received marking color information in a storage; and
   create a set of damage figures according to the detected markings of the colors and the stored marking color information, the set of damage figures having a layered structure constituted of layers, each of the layers corresponding to one of the colors of the markings and including a damage figure formed by tracing the markings of the one of the colors, each of the layers being assigned with information on classified widths of the cracks.

2. A damage figure creation supporting method comprising:
   acquiring an image obtained by photographing a surface of a structure in color, the surface being applied with markings by drawing lines along cracks appearing on the surface, colors of the markings corresponding to widths of the cracks;
   analyzing the image and detecting the markings applied on the surface of the structure for respective colors;
   receiving marking color information on the widths of the cracks respectively defined for the colors of the markings input from a user;
   storing the received marking color information in a storage; and
   creating a set of damage figures according to the detected markings of the colors and the stored marking color information, the set of damage figures having a layered structure constituted of layers, each of the layers corresponding to one of the colors of the markings and including a damage figure formed by tracing the markings of the one of the colors, each of the layers being assigned with information on classified widths of the cracks.

3. A non-transitory computer-readable recording medium storing a command that, when read by a computer, causes the computer to execute a damage figure creation supporting function comprising:
   a function of acquiring an image obtained by photographing a surface of a structure in color, the surface being applied with markings by drawing lines along cracks appearing on the surface, colors of the markings corresponding to widths of the cracks;
   a function of analyzing the image and detecting the markings applied on the surface of the structure for respective colors;

a function of receiving marking color information on the widths of the cracks respectively defined for the colors of the markings input from a user;

a function of storing the received marking color information in a storage; and a function of creating a set of damage figures according to the detected markings of the colors and the stored marking color information, the set of damage figures having a layered structure constituted of layers, each of the layers corresponding to one of the colors of the markings and including a damage figure formed by tracing the markings of the one of the colors, each of the layers being assigned with information on classified widths of the cracks.

4. The damage figure creation supporting apparatus according to claim 1, wherein the processor is configured to detect the markings applied on the surface of the structure for the respective colors by means of a learned model obtained by machine learning using images including markings of a plurality of colors as data for learning.

5. The damage figure creation supporting method according to claim 2, wherein the detecting includes detecting the markings applied on the surface of the structure for the respective colors by means of a learned model obtained by machine learning using images including markings of a plurality of colors as data for learning.

6. The non-transitory computer-readable recording medium according to claim 3, wherein the function of detecting includes a function of detecting the markings applied on the surface of the structure for the respective colors by means of a learned model obtained by machine learning using images including markings of a plurality of colors as data for learning.

* * * * *